United States Patent
Yamaguchi et al.

(10) Patent No.: US 7,017,633 B2
(45) Date of Patent: Mar. 28, 2006

(54) SAFETY TIRE WITH EXPANSION-DEFORMING TORIC AIR BAG

(75) Inventors: Yuji Yamaguchi, Kodaira (JP); Masahiko Yamamoto, Kodaira (JP); Yugo Zuigyo, Kodaira (JP); Osamu Saito, Kodaira (JP); Tetsuhito Tsukagoshi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 328 days.

(21) Appl. No.: 10/182,390

(22) PCT Filed: Nov. 9, 2001

(86) PCT No.: PCT/JP01/09831

§ 371 (c)(1),
(2), (4) Date: Jul. 30, 2002

(87) PCT Pub. No.: WO02/43975

PCT Pub. Date: Jun. 6, 2002

(65) Prior Publication Data

US 2003/0178116 A1    Sep. 25, 2003

(30) Foreign Application Priority Data

Nov. 30, 2000  (JP) ............... 2000-365025
Dec. 27, 2000  (JP) ............... 2000-396842
May 25, 2001   (JP) ............... 2001-156368

(51) Int. Cl.
*B60C 17/02* (2006.01)
*B60C 5/08* (2006.01)
*B60C 5/22* (2006.01)

(52) U.S. Cl. ................. 152/195; 152/458; 152/341.1; 152/512; 152/519

(58) Field of Classification Search ............ 152/192, 152/195, 458, 512, 518, 519, 339.1–342.1
See application file for complete search history.

(56) References Cited

U.S. PATENT DOCUMENTS 2,510,974 A * 6/1950 Hainlen ............... 152/342.1
3,018,813 A * 1/1962 Koch et al. ........... 152/341.1
3,724,521 A * 4/1973 Coddington et al. ... 152/340.1
4,008,743 A * 2/1977 Welch ................ 152/519 X
4,153,095 A   5/1979 Sarkissian (Continued)

FOREIGN PATENT DOCUMENTS

DE    25 20 321 A1 * 11/1976

(Continued)

OTHER PUBLICATIONS

Elements of Materials Science and Engineering, fourth edition, Lawrence Van Vlack: Addison-Wesley Publishing Company, 1980, p. 260.*

*Primary Examiner*—Adrienne C. Johnstone
(74) *Attorney, Agent, or Firm*—Sughrue Mion, PLLC

(57) ABSTRACT

There is proposed a toric air bag for a safety tire capable of sufficiently and equally contacting with a full inner face of a tire in the expansion-deformation of the toric air bag by a drop of an internal pressure in the tire, wherein at least an expansion-deforming portion of the toric air bag having a hollow torus shape as a whole is constructed with a tension support member, and to the expansion-deforming portion is given a property indicating a characteristic of extension ratio-tensile force that tensile force per unit width is substantially and gradually increased with the increase of elongation through the expansion-deformation.

19 Claims, 13 Drawing Sheets

U.S. PATENT DOCUMENTS

| | | | |
|---|---|---|---|
| 4,216,809 A | 8/1980 | Pixley | |
| 4,871,004 A * | 10/1989 | Brown et al. | 152/548 X |
| 6,283,185 B1 * | 9/2001 | Rivaton | 152/340.1 |
| 6,354,348 B1 * | 3/2002 | Taillandier | 152/342.1 |
| 6,467,518 B1 * | 10/2002 | Clouet et al. | 152/340.1 |
| 6,481,481 B1 * | 11/2002 | Clouet | 152/340.1 |
| 6,571,845 B1 * | 6/2003 | Caretta et al. | 152/339.1 |
| 6,712,107 B1 * | 3/2004 | Clouet | 152/340.1 |

FOREIGN PATENT DOCUMENTS

| | | |
|---|---|---|
| DE | 25 53 449 A1 * | 6/1977 |
| GB | 1 517 916 A | 7/1980 |
| JP | 47-044601 A | 12/1972 |
| JP | 51-019202 B2 | 6/1976 |
| JP | 52-86604 A | 7/1977 |
| JP | 54-053402 A | 4/1979 |
| JP | 54-053403 A | 4/1979 |
| JP | 06-336103 A | 12/1994 |
| JP | 2001-523607 A | 11/2001 |
| JP | 2001-526140 A | 12/2001 |
| WO | WO 99/25570 A2 | 5/1999 |
| WO | WO-9925570 A2 * | 5/1999 |
| WO | WO 99/32308 A | 7/1999 |

* cited by examiner

COMPARATIVE

COMPARATIVE

SAFETY TIRE WITH EXPANSION-DEFORMING TORIC AIR BAG

TECHNICAL FIELD

This invention relates to a toric air bag for a safety tire which is used in a safety tire capable of continuing a safe running over a given distance even if an internal tire pressure drops or disappears due to puncture of the tire or the like and which is expansion-deformed by the drop of the internal tire pressure or the like to subrogate a load support from the tire.

BACKGROUND ART

Heretofore, there have been proposed various tires as a safety tire capable of continuously and safely running to a place provided with equipment for exchanging or repairing the tire even if the internal tire pressure drops or disappears due to the puncture of the tire, damage of an air valve or the like.

Among them, International Publication brochure WO98/23457 and International Publication brochure WO99/32308 disclose, for example, safety tires each consisting of a combination of a tire comprising a tread portion, a pair of sidewall portions and bead portions with a toric air member placed in the tire and inflated under an internal pressure and expansion-deformed by the drop of the internal tire pressure to subrogate a load support from the tire.

In the former safety tire, two cross cord layers similar to a belt of the tire are arranged on an outer circumferential portion of the toric air member as a reinforcing member for restraint, and a pressure higher by 50–500 kPa than the internal pressure of the tire is filled into the toric air member placed in the tire in use, and if the puncture of the tire is caused, the cords of the reinforcing member for restraint are broken by an expansion force of the toric air member and hence the load support is subrogated by the expanded toric air member from the tire. The latter is a safety tire of a double tire system formed by assembling an outer tire and a torus film (toric air member) placed therein and being similar to a radial tire structure onto a rim, wherein the toric air member provided with a turnup reinforcing ply is provided on its outer circumferential portion with plural reinforcing annular elements (cords) arranged at given intervals in a widthwise direction, and if the tire is punctured, cords of the turnup reinforcing ply and the reinforcing annular elements are broken by an expansion force of the toric air member and hence the toric air member subrogates the load support from the tire.

Among these safety tires, the type of breaking the cords in the inside of the toric air member has a fear that the toric air member itself is damaged and broken by the broken cord end to loss a function as a safety tire, while the type of breaking the cords at the outside of the toric air member becomes high in the fear that the broken cords damage an outer face portion of the toric air member and an inner face portion of the tire including a carcass. In any types, therefore, it is difficult to sufficiently ensure a safe runnable distance after the puncture of the tire required in this type of the safety tire.

On the other hand, International Publication brochure WO00/30877 discloses a safety tire wherein the turnup reinforcing ply arranged in the toric air member is made of cords each consisting of a core wire and winding wires helically wound around the core wire, and the cord is durable to a pressure difference in usual running and a centrifugal force and has a structure that the core wire is broken but the winding wires are extended without breaking in the occurrence of air loss due to the puncture and the like, and a periphery sufficient to an expansion-deformation of the toric air member is given to the winding wire, whereby the occurrence of the aforementioned problem when the cords are broken as a whole can be avoided.

In this safety tire, however, it is not guaranteed that the core wire in the cord as a tension-resistant member is timely broken over a full circumference and a full width of the toric air member in the expansion-deformation of the toric air member. Up to a time that the winding wires of the cord support the expansion force of the toric air member after the breakage of the core wire in the cord, the toric air member is violently expansion-deformed under an action of a small tensile force or a small tensile stress, so that there is a problem that the toric air member is equally contacted with the full inner face of the tire.

The invention is to solve the above problems of the conventional technique and to provide a toric air bag for a safety tire capable of sufficiently and equally contacting with a full inner face of a tire without causing problems in the durability and the like resulted from the breakage of the cord itself when the toric air bag is expansion-deformed accompanied with the drop of an internal tire pressure or the like.

DISCLOSURE OF THE INVENTION

A toric air bag for a safety tire according to the invention is placed inside a tire and inflated under a certain internal pressure and expansion-deformed based on the drop of the internal tire pressure to subrogate a load support from the tire, in which at least an expansion-deforming portion of the toric air bag having a hollow torus shape is made of a tension support member and properties which indicate a characteristic of such extension ratio-tensile force that as an extension is increased by the expansion-deformation, a tensile force per unit width is gradually increased, are given to the expansion-deforming portion.

The tension support member is preferable to be constructed with one or more polymer sheets, or with one or more layers of a composite of polymer sheet or fibrous member and rubber.

The safety tire comprised of such a toric air bag and a tire accommodating the toric air bag is assembled onto a standard rim to form a safety tire-rim assembly, which is put into use by filling a given air pressure or gas pressure other than air into the inside of the tire and filling an internal pressure higher than the internal tire pressure into the inside of the toric air bag.

The term "standard rim" used herein means a rim defined in JATMA YEAR BOOK (2000), ETRTO STANDARD MANUAL 2000, TRA(THE TIRE and RIM ASSOCIATION INC.) 2000 YEAR BOOK and so on. In JATMA YEAR BOOK, the standard rim means an approved rim described in general information. A given air pressure means an air pressure specified in accordance with a load capacity defined in the same JATMA YEAR BOOK, ETRTO STANDARD MANUAL, TRA YEAR BOOK and so on.

In such a safety tire assembled onto the rim, when it is run under loading in the presence of a given air pressure filled in the tire, the rubbing of the expansion-deforming portion of the toric air bag with an inner circumferential face of a tread portion or the like by an action of centrifugal force or others can effectively be prevented in a ground contact zone of the tread portion by an action of the tension support member serving as a size growth-restraining member in the toric air bag and hence the polymer sheet or the composite.

On the other hand, when the pressure difference between the inside and the outside of the toric air bag exceeds a given value due to the drop or disappear of the internal tire pressure, the expansion-deforming portion of the toric air bag is subjected to an expansion-deformation under an extension-deformation of the polymer sheet or the composite and approximately equally closed over a full inner face of the tire, so that the toric air bag subrogates the load support from the tire while holding the internal pressure and suppressing the increase of bending deformation of the tire and hence a continuous safe running can be attained even in the puncture of the tire or the like.

In the expansion-deformation of the expansion-deforming portion of the toric air bag made of the polymer sheet or the composite as a tension support member due to the puncture of the tire or the like, since the expansion-deforming portion has such an extension ratio-tensile force characteristic that the tensile force per unit width gradually increases as the extension increases, the expansion-deformation portion and hence the toric air bag is expansion-deformed in both directions of full circumference and full width without concentration of local deformation, and as a result the toric air bag is gradually and equally expansion-deformed toward the inner face of the tire to surely close to the full inner face of the tire.

Therefore, it can effectively prevent the degradation of the durability in the tire and the toric air bag resulted from biased contact or imbalanced contact of the toric air bag with the inner face of the tire or the like.

Moreover, it is preferable that a region of the toric air bag contacting with a wheel rim or facing thereto is substantially a non-expansion deforming portion.

According to this construction, the property of the toric air bag fitting to the rim is sufficiently ensured by the non-expansion deforming portion, and the change in the contact posture of the toric air bag to the inner face of the tire is sufficiently prevented under the action of the toric air bag even in the running of the safety tire under loading or a so-called run-flat running, whereby the durability can be more improved.

Further, it is preferable that an initial rigidity in a biaxial direction is given to the expansion-deforming portion of the toric air bag. The term "initial rigidity" used herein means that a tensile modulus determined from a gradient up to 5% extension before the expansion-deforming portion or the tension support member is directly subjected to the expansion deformation is not less than 10 MPa, and the term "biaxial direction" means two axial lines perpendicular to each other in an arbitrary direction.

Such an initial rigidity in the biaxial direction enhances the shape holding property of the toric air bag before the toric air bag is expansion-deformed by the drop of the internal tire pressure, and serves to sufficiently equalize the extensions in the respective directions while effectively restraining the extension in only one direction.

When the tensile modulus is less than 10 MPa, the shape holding property of the toric air bag is lacking and an outer diameter thereof or the like becomes large, and hence there is caused a fear that the toric air bag is damaged by contacting with the inner face of the tire.

Furthermore, it is preferable that a curve of tensile force to extension ratio in the expansion-deforming portion of the toric air bag is changed in substantially a hook form within an extension range up to 100% extension ratio.

More concretely, an average gradient of tensile force to extension ratio of 0–5% when the expansion-deforming portion of the toric air bag expands based on the supply of an internal pressure to the toric air bag is made larger than an average gradient of tensile force to extension ratio of 5–100% when the expansion-deforming portion is expansion-deformed accompanied with the drop of the internal tire pressure.

According to this construction, an increasing ratio of tensile force in the expansion-deforming portion of the toric air bag to the extension ratio is large when the safety tire is normally run under loading, so that a large force resisting to centrifugal force or the like can be given to the expansion-deforming portion, while when the expansion-deforming portion extends over 5% and is expansion-deformed due to the puncture of the tire or the like, the expansion-deforming portion of the toric air bag is deformed smoothly and gently under a small increasing ratio of tensile force to the extension ratio, whereby the expansion-deforming portion and hence the toric air bag can be sufficiently equally contacted with the full inner face of the tire.

On the contrary, when the expansion-deforming portion of the toric air bag is rapidly deformed, a region of the expansion-deforming portion in the toric air bag prematurely contacting with the inner face of the tire is locally produced, and hence the biased contacting of the toric air bag with the inner face of the tire, partial bending of the toric air bag and so on are easily caused. Once they are caused, an appropriate contact state can not be obtained by friction force between the toric air bag and the tire, bending way of the toric air bag and the like.

In order to realize the appropriate expansion-deformation of the toric air bag as previously mentioned, a degree of lowering the tensile force to the extension ratio of 5–100% from a maximum value of the tensile force to the extension ratio of 0–5% in the expansion-deforming portion of the toric air bag is rendered into not more than 50% of the maximum value, preferably not more than 40%, more preferably not more than 30% at an atmospheric temperature of 25° C.

In other words, when the lowering degree of the tensile force in the expansion-deforming portion of the toric air bag exceeds over 50% of the maximum value in the expansion-deformation, the violent deformation of the expansion-deforming portion of the toric air bag is not deniable and a fear of locally and prematurely contacting the toric air bag with the inner face of the tire becomes higher.

Incidentally, when a nonwoven fabric is used as a fibrous member, as an extension form of the nonwoven fabric, a portion having a lowest tension resistance first starts the deformation, and subsequently a portion having a lower tension resistance starts the deformation before the first portion reaches a deformation limit, and similar deformation is repeated until the extension over a whole is completed, so that the tensile force may locally somewhat lower on the way of the expansion-deformation of the toric air bag, but viewing the nonwoven fabric as a whole, the tensile force gradually increases with the increase of the expansion-deformation, and hence the sufficiently equal contacting of the toric air bag with the inner face of the tire can be realized and the tension distribution of the toric air bag itself can be made sufficiently uniform.

In the above composites, particularly the composite of fibrous member and rubber, the unit thickness of the fibrous member is preferable to be within a range of 0.05–2.0 mm because a homogeneous penetration of rubber over a whole of the thickness of the fibrous member or a uniform distribution of the fibrous member to rubber is produced to properly develop a tension-resistance function inherent to the composite, i.e. a shape holding function for the toric air bag at a normal state of the tire and the extension function at the puncture in the composite.

When the fibrous member is used in the composite, the fibrous member is preferable to be constructed with a nonoriented fiber material.

When the fibrous member is constructed with a fiber material in which short fibers are randomly arranged, or with a nonoriented material such as a nonwoven fabric or the like, the aforementioned rigidity in the biaxial direction can be favorably developed. In this case, when the tire is relatively largely broken, the protrusion of the expansion-deformed toric air bag from the broken portion toward the outside of the tire can be prevented to effectively protect the toric air bag against an external injury.

In other words, when the expansion-deforming portion of the toric air bag is comprised of only rubber having no fibrous member, or when the fibrous member in the composite has only a rigidity in a uniaxial direction, the expansion-deforming portion of the expansion-deformed toric air bag largely protrudes from the broken portion of the tire toward outside and hence a fear of subjecting the toric air bag to an external injury becomes higher.

And also, the fibrous member is preferable to have a structure that ends of fibers are dispersed as in the nonwoven fabric. Because, when the fiber ends are regularly aligned in the fibrous member, a trouble resulted from stress concentration in locations of the fiber ends is easily caused in the expansion-deformation of the toric air bag.

As a fiber material used in the nonwoven fabric, mention may be made of synthetic materials such as polyester, polyamide and polyvinyl alcohol and natural fibers such as rayon, cellulose and the like alone or in a combination of two or more thereof. And also, fiber material other than the aforementioned ones may be used. Furthermore, a fiber of two-layer structure in which an inner layer and an outer layer of the fiber itself are made from different materials may be used as a material for the nonwoven fabric.

Since rubber in the nonwoven fabric composite penetrates or invades between the fibers through heat and pressure at a vulcanization step, it is not generally necessary to take a treatment such as an application of particular adhesive to the nonwoven fabric or the like, but the application of the adhesive or the like may be carried out if it is required to obtain a higher adhesion force.

And also, it is preferable that the fiber quantity to rubber in the nonwoven fabric is within a range of 4–50 mass % for guaranteeing uniform dispersion of the fibers in rubber. Furthermore, the weight of the nonwoven fabric is preferable to be within a range of 100–3000 $mN/m^2$ (10–300 $g/m^2$).

When the weight is less than 100 $mN/m^2$, the unevenness of fiber distribution becomes large and it is difficult to ensure the uniformity of the composite, and hence the scattering in the strength, rigidity and elongation at break of the composite becomes large, while when the weight exceeds 3000 $mN/m^2$, the peeling between fiber and rubber in the composite is apt to be easily caused.

And also, it is preferable that the average diameter of the fiber in the nonwoven fabric is within a range of 0.01–0.2 mm. When the fiber diameter is less than 0.01 mm, the entanglement of the fibers is sufficient but the penetrability of rubber is poor and a fear of causing interlaminar peel or the like becomes high, while when it exceeds 0.2 mm, the penetrability of rubber is high but the entanglement of fibers is less and a fear of lacking the rigidity of the composite or the like remains.

Moreover, the fibrous member may be constituted with plural fiber layers, for example, plural fiber cord layers in which the layers of fiber materials arranged side by side are crossed with each other. In this case, the orientation of the fiber materials is unavoidable, but it is possible to ensure the rigidities in biaxial directions and also the protrusion of the expansion-deformed toric air bag from the large broken portion of the tire or the like can be effectively prevented.

In the aforementioned toric air bag, when two or more composite layers are further arranged on a portion opposite to the inner circumferential face of the tire tread portion, the approaching deformation of the toric air bag to the inner circumferential face of the tread portion resulted from the action of centrifugal force or the like can be directly restrained. In this case, the width of the composite is preferable to be 0.2 times or more a maximum width of an inner face of a sidewall portion in the safety tire assembled onto the rim as previously mentioned in order to control creep of the composite resulted from the action of centrifugal force. Moreover, the constructions of the composites among two or more composite layers, for example, kinds of fibrous members may be differed with each other.

Furthermore, two or more layers of the composite can be arranged over mutual points corresponding to a position of a maximum width of the toric air bag. In this case, the composite directly serves as a member more countering to the centrifugal force during the running of the safety tire under loading at normal state of the tire.

Moreover, two or more layers of the composite may be arranged on a portion corresponding to a bead base of the tire. In this case, a force of restraining the toric air bag to a given position is enhanced and particularly an accidental position shifting of the toric air bag in the expansion-deformation and after the expansion-deformation can be effectively prevented.

In case of arranging the composite on each portion of the toric air bag as mentioned above, it is preferable that with respect to the rigidities of constitutional portions, each of the rigidity at a crown region and the rigidity at a region corresponding to the bead base of the tire in the toric air bag at a posture under an inflation of an internal pressure is made larger than the rigidity at each side region adjacent to the crown region in order to sufficiently prevent the position shifting of the toric air bag as mentioned above and to sufficiently ensure a flat shape of the toric air bag during the normal running at a high speed and to ensure the maintenance of the flat shape of the toric air bag in the application to a tire having a high flatness degree.

The polymer sheet in the composite is preferable to have an initial modulus of 0.1–1.3 GPa, a yield stress of 10–33 MPa and an elongation at break of not less than 20%, whereby the excellent shape holding property of the toric air bag and the expansion-deformation thereof can be attained. That is, when the properties are less than the lower limits of the above numerical values, it is difficult to ensure the sufficient shape holding property, while when they exceeds the upper limits, it is difficult to attain the sufficient expansion-deformation.

And also, when a property that the contacting of the toric air bag with the inner face of the tire is carried out in a plastic deformation zone of the composite is given to the polymer sheet composite, it is possible to easily and surely identify the toric air bag after the development of its function at once due to the puncture of the tire or the like through visual observation, and hence a mistaken reuse of the toric air bag can effectively be prevented.

In such a toric air bag provided with the composite, it is preferable that a ratio $E_P/E_W$ of tensile stress $E_P$ at 3% elongation in a circumferential direction to tensile stress $E_W$ at 3% elongation in a widthwise direction at a portion facing to the inner circumferential face of the tire tread portion is not less than 1.

More preferably, a ratio $E_{CP}/E_{CW}$ of tensile stress $E_{CP}$ at 3% elongation in the circumferential direction to tensile stress $E_{CW}$ at 3% elongation in the widthwise direction at the portion of the toric air bag provided with the composite facing to the inner circumferential face of the tread portion and a ratio $E_{SP}/E_{SW}$ of tensile stress $E_{SP}$ at 3% elongation in the circumferential direction to tensile stress $E_{SW}$ at 3% elongation in the widthwise direction at a side portion adjacent to the portion facing to the inner circumferential face of the tread portion satisfy a relation of $E_{CP}/E_{CW} \geq E_{SP}/E_{SW}$.

In such a toric air bag provided with the composite, the term "tensile stress at 3% elongation in the circumferential direction" means a value obtained by dividing a force required for providing 3% elongation by an initial sectional area when a test piece of 200 mm in length and 25 mm in width is cut out from the toric air bag in the circumferential direction and attached to a tension testing machine and tensioned at a rate of 50 mm/min in a longitudinal direction of the test piece, and the term "tensile stress at 3% elongation in the widthwise direction" means a value obtained by dividing a force required for providing 3% elongation by an initial sectional area of the composite when a test piece of 200 mm in length and 25 mm in width is cut out from the toric air bag in the widthwise direction and attached to a tension testing machine and tensioned at a rate of 50 mm/min in a longitudinal direction of the test piece. They are true in the tensile stress of the other portions of the toric air bag.

When the expansion-deforming portion of the toric air bag is expansion-deformed inside the tire, it is required that the composite is extended by not less than 15% without rapture or breakage, preferably along the circumferential direction of the toric air bag, to accept the expansion of the expansion-deforming portion. For this end, the ratio $E_P/E_W$ of tensile stress $E_P$ at 3% elongation in the circumferential direction to tensile stress $E_W$ at 3% elongation in the widthwise direction is preferable to be not less than 1.

When the ratio $E_P/E_W$ is less than 1, the reinforcing effect in the circumferential direction of the toric air bag is not sufficient and it is difficult to sufficiently control the extension of the toric air bag countering to a centrifugal force produced by rotation during the normal running at about 100 km/h and a tension produced by a difference of internal pressure between the toric air bag and the tire. In other words, even if the ratio $E_P/E_W$ is less than 1, it is possible to ensure the required strength in the circumferential direction by increasing the number of the composite layers, but it is obliged to increase the weight of the toric air bag and hence the weight of the safety tire.

Furthermore, when the ratios of tensile stresses at 3% elongation in the toric air bag itself satisfy $E_{CP}/E_{CW} \geq E_{SP}/E_{SW}$, the ratio of rigidity in the circumferential direction at the portion facing to the inner circumferential face of the tread portion becomes higher and the shape holding property corresponsive to a tire having a high flatness degree can be provided.

Moreover, low-rigidity parts, e.g. low elastic members are annularly arranged on at least one layer among the two or more composite layers at least arranged over a full circumference of the portion facing to the inner circumferential face of the tire tread portion at one or more symmetrical positions with respect to the equatorial plane of the tire.

According to this toric air bag, when the tire-rim assembly is rotated under loading at a state of filling a given air pressure, e.g. a maximum air pressure defined in a standard according to JATMA YEAR BOOK, ETRTO STANDARD MANUAL, TRA YEAR BOOK or the like into the tire and filling an air pressure higher than the above air pressure into the toric air bag, the two or more composite layers serve to more effectively control the size growth of the toric air bag resulted from the centrifugal force or the like and particularly it surely prevents the rubbing of the toric air bag with the inner circumferential face of the tread at a ground contact region of the tread.

As a gas filling into the tire and the toric air bag, a nitrogen gas or other inert gas may be used instead of air.

On the other hand, when the difference in pressure between the inside and the outside of the toric air bag exceeds a given value due to the drop of the internal tire pressure or the like, the composite is extension-deformed to not less than 15% in the elastic region or from the elastic region toward the plastic region and the expansion-deforming portion of the toric air bag is expanded accompanied therewith.

In such an extension-deformation of the composite, since the composite is provided with the low-rigidity part at a position symmetrical with respect to the equatorial plane of the tire, for example, at a widthwise central portion of the composite, the extension-deformation starts from the central portion of the composite being the low-rigidity part and hence the expansion-deforming portion of the toric air bag is substantially uniformly enlarged and deformed over a full circumference at the portion corresponding to the central portion of the composite.

Such an enlargement-deformation of the toric air bag started from a given position in the widthwise direction gradually propagates to widthwise adjoining portions of the composite symmetrically with respect to the equatorial plane and finally over a full width of the composite, and hence the toric air bag is approximately equally enlarged and deformed over the whole of the composite in the widthwise direction.

Therefore, even if there is a scattering in the rigidity at the side portions of the composite, the expansion-deformation of the expansion-deforming portion in the toric air bag biasing toward widthwise one side of the composite can sufficiently be prevented, and as a result there are not caused problems such as local thinning of the toric air bag, lowering of load supporting ability and durability due to local contact with the inner face of the tire and so on.

If the low-rigidity part is arranged in the composite at plural places, the whole of the toric air bag can be more rapidly expansion-deformed while maintaining the above function and effects.

And also, when the rigidity is gradually changed in one low-rigidity part, the start of the extension-deformation of the composite and hence the start of the expansion-deformation of the toric air bag can be conducted more prematurely and more smoothly, and also the propagation of the expansion-deformation in the widthwise direction can be conducted more smoothly.

Moreover, the low-rigidity part may be arranged on each widthwise side portion of the composite, whereby the rigidities of these side portions can be sufficiently decreased as compared with those of the other portions to start the propagation of the expansion-deformation of the toric air bag from these side portions. However, considering that the propagation of the expansion-deformation of the toric air bag is largely affected by an influence of the scattering in the rigidity being apt to be produced in the side portions of the reinforcing layer, it is preferable to arrange the low-rigidity part at a position separated from a side edge of the composite.

In this case, the low-rigidity part may be constructed with a thinned portion of the composite, for example, a portion reducing a gauge of the composite itself, or with an annular notched portion formed in the composite.

In the other toric air bag, at least one protection layer comprising a plurality of reinforcing elements extending in a circumferential direction in substantially a wavy form, preferably rubberized reinforcing elements is arranged on at least a portion facing to the inner circumferential face of the tire tread portion and frequently at an outer circumferential side of the composite along a full circumference thereof, in which wavy pitch and amplitude of the reinforcing element are selected so as to still retain the wavy form in the reinforcing element at a posture of closing the toric air bag to the inner face of the tire.

In this case, it is preferable that these reinforcing elements are arranged side by side in the same phase of the wavy form or in a regular phase shifting thereof.

According to this toric air bag, when the toric air bag is closed to the inner face of the tire at an expansion posture for supporting a load, if the tire tread portion is subjected to an external injury through sharpened stone or other foreign matter to arrive such a foreign matter at the toric air bag, since the reinforcing elements of the protection layer, which are arranged in the portion of the toric air bag facing to the inner circumferential face of the tread portion or on an outer circumferential face of the toric air bag or a vicinity thereof and comprise cords or filaments extending in the wavy form, still maintain the wavy form under the expansion-deformation of the toric air bag to retain a sufficient extension margin and also a tensile force is not substantially applied thereto, the protection layer and hence the toric air bag can flexibly deform so as to envelop the foreign matter therein and as a result the damages resulted from the impaction of the toric air bag with the foreign matter can be effectively prevented.

Moreover, the reinforcing element is preferable to be made of a chemical fiber cord as compared with a steel cord in order to attain the weight reduction of the toric air bag. Particularly, when it is made of an aramid fiber cord, the strength of the cord can be largely increased.

When a wavy belt comprised of steel cords extending in a circumferential direction in substantially a wavy form is used as a part of the tension support member, the strength of the toric air bag can be more increased. And also, it can be used as an adjusting means of the rigidity in the biaxial direction.

BEST MODE FOR CARRYING OUT THE INVENTION

Figure 1:
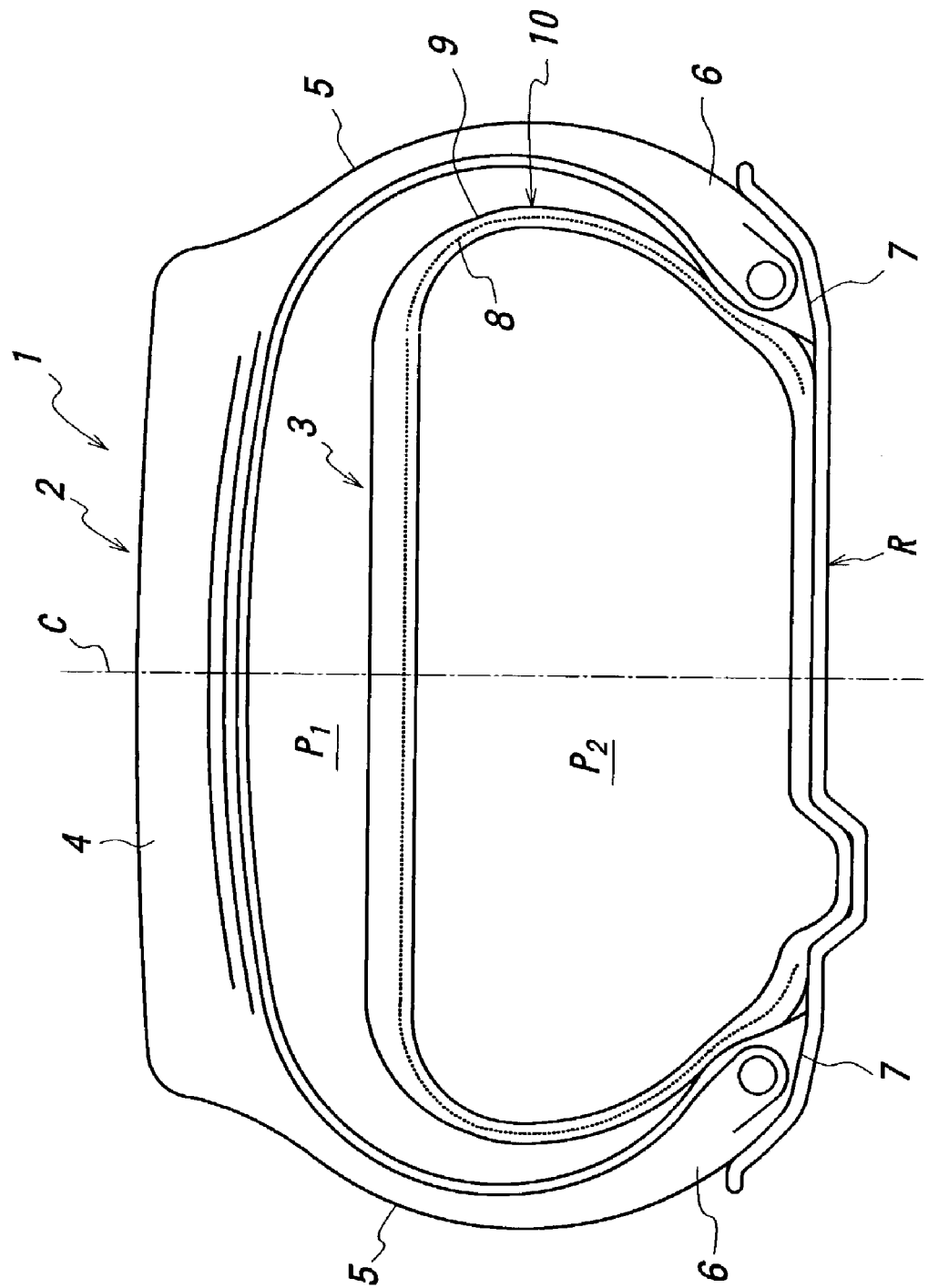
FIG. 1 is a diagrammatically section view of an embodiment of the toric air bag for a safety tire according to the invention illustrating a state of assembling the safety tire onto a rim.

In FIG. 1 is shown a section view of a toric air bag according to the invention at an assembled state of a safety tire and a rim, in which numeral 1 is a whole of a safety tire, and the safety tire 1 is a combination of a tire 2 and a toric air bag 3 placed therein.

The tire 2 is the same as a general pneumatic tire and comprises a tread portion 4, sidewall portions 5 connecting to both sides thereof, and a bead portion arranged at an inner circumferential side of the sidewall portion 5.

And also, the toric air bag 3 having a hollow torus as a whole comprises on its periphery an expansion-deforming portion contributing to support a load by expansion-deformation accompanied with a drop or disappear of an internal pressure in the tire 2, and a non-expansion deforming portion positioning opposite to or close to a rim assembled onto the tire and not substantially conducting expansion-deformation.

In such a toric air bag 3, at least an expansion-deforming portion, which is extended outward from a position corresponding to both bead bases 7 of the tire in a radial direction inclusive of a portion adjacent thereto as a whole in the illustrated embodiment, is constructed with a tension support member, and the tension support member is formed by one or more polymer sheets, or by a composite of a polymer sheet and rubber, or by at least one layer of a composite of fiber member 8 and rubber 9 in the illustrated embodiment.

In the toric air bag 3, therefore, it is possible to construct the non-deforming expansion-deforming portion with the tension support member.

The safety tire 1 can be used as a rim assembly by assembling the tire 2 onto an approved rim R previously mentioned, and filling a given internal pressure $P_1$, for example, a maximum air pressure defined, for example, according to JATMA YEAR BOOK or the like into the-inside of the tire through a valve fixed thereto, and also filling a given internal pressure $P_2$ into the inside of the toric air bag 3. Moreover, an objective for the filling of the internal pressure may be an inert gas or other gas in addition to air.

In this case, the outer diameter of the toric air bag 3 is set to be smaller than the outer diameter of the inner circumferential face of the tread portion. And also, the internal pressure $P_2$ of the toric air bag is usually a value higher than the internal tire pressure $P_1$.

A composite 10, particularly a polymer sheet or fibrous member 8 as a tension support member is arranged at a distance separated from the inner circumferential face of the tread portion as a size growth controlling member countering to a force produced by a centrifugal force and a difference of internal pressure in a portion of the toric air bag 3 or a crown region thereof opposite to the inner circumferential face of the tread portion 4 at a ground contact region of the tread portion when the tire in such a rim assembly is run under loading in the presence of the given internal pressure $P_1$.

On the other hand, when the pressure difference between the inside and the outside in the toric air bag 3 exceeds a given value due to the drop of the internal tire pressure to, for example, an atmospheric pressure, the expansion-deforming portion of the toric air bag 3 is expansion-deformed by the extension-deformation of the composite 10, directly the polymer sheet or fibrous member 8 to sufficiently and equally close to the inner face of the tire over a whole thereof, and as a result the support of load is subrogated from the tire 2 to the toric air bag 3.

Therefore, even if the tire is punctured or the like, the sufficiently safe running can be continued under the action of the toric air bag 3.

Figure 2:
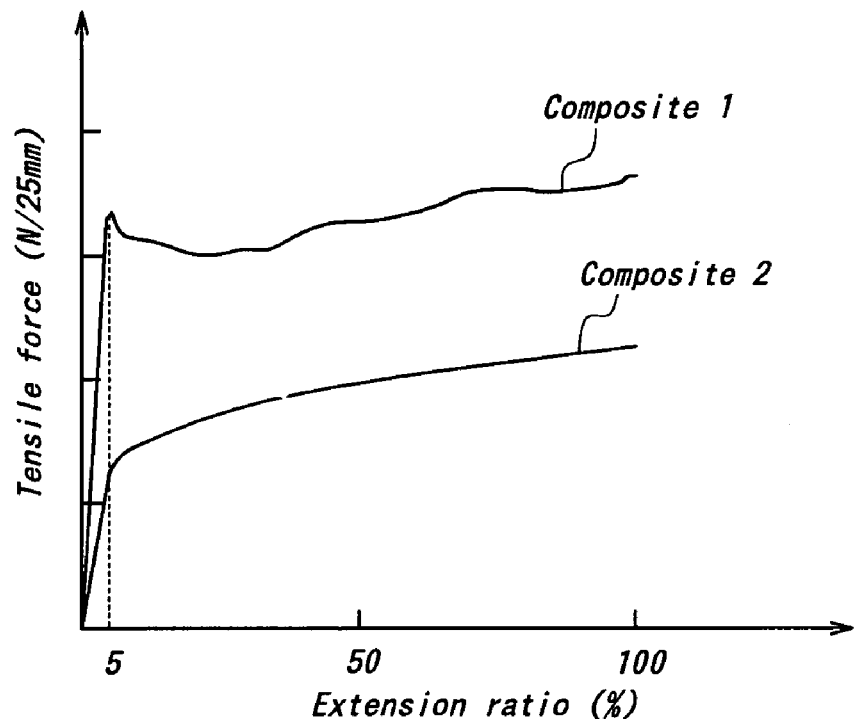
FIG. 2 is a graph showing a change of tensile force to extension ratio in a composite constituting a tension support member.

In the expansion-deformation of the toric air bag 3 accompanied with the drop of the internal tire pressure as mentioned above, the expansion-deforming portion of the toric air bag 3 has an extension ratio-tensile force characteristic that as shown in FIG. 2 using two kind of the composites, tensile force per unit width, for example, a width of 25 mm substantially gradually increases as an elongation through the expansion-deformation, i.e. an elongation at an extension ratio exceeding 5% in the figure increases.

Moreover, an extension up to 5% in the composite shown in FIG. 2, i.e. the expansion-deforming portion thereof or a greater part thereof is generated by filling the internal pressure $P_2$ into the toric air bag 3 for rendering the safety tire 1 into the rim assembly as previously mentioned.

The expansion-deforming portion of the toric air bag 3 indicating a characteristic of such an extension ratio-tensile force is uniformly and gradually extended as a whole in both of circumferential direction and widthwise direction of the expansion-deforming portion based on the action of, for example, the composite 10 arranged over a whole of the expansion-deforming portion in the aforementioned expansion-deformation resulted from the puncture of the tire or the like, and as a result the expansion-deforming portion is equally and surely closed to the full inner face of the tire.

In this case, it is preferable that a curve of tensile force to extension ratio is changed in substantially a hook form within an extension range of the expansion-deforming portion of the toric air bag arriving to 100% extension ratio. For this purpose, it is preferable that an average gradient of tensile force to extension ratio of 0–5% in the expansion-deforming portion is made larger than an average gradient of tensile force to extension ratio of 5–100%.

According to the above, the composite strongly withstands to the expansion-deformation of the toric air bag 3 under a large gradient of tensile force and can effectively control the size growth thereof during the running of the safety tire under loading before the tire 2 in the rim assembly causes troubles such as puncture or the like, while in the expansion-deformation of the toric air bag 3 by the puncture of the tire or the like, the toric air bag 3 can be gradually expansion-deformed under a small gradient of tensile force to more equally close the expansion-deforming portion of the toric air bag 3 to the full inner circumferential face of the tire.

This becomes particularly remarkable when the deformation rate of the expansion-deforming portion of the toric air bag 3 is more controlled when a degree of lowering tensile force to extension ratio of 5–100% from a maximum value of tensile force to extension ratio of 0–5% in the toric air bag is rendered into not more than 50% of the maximum value, preferably not more than 30% thereof.

Figure 3:
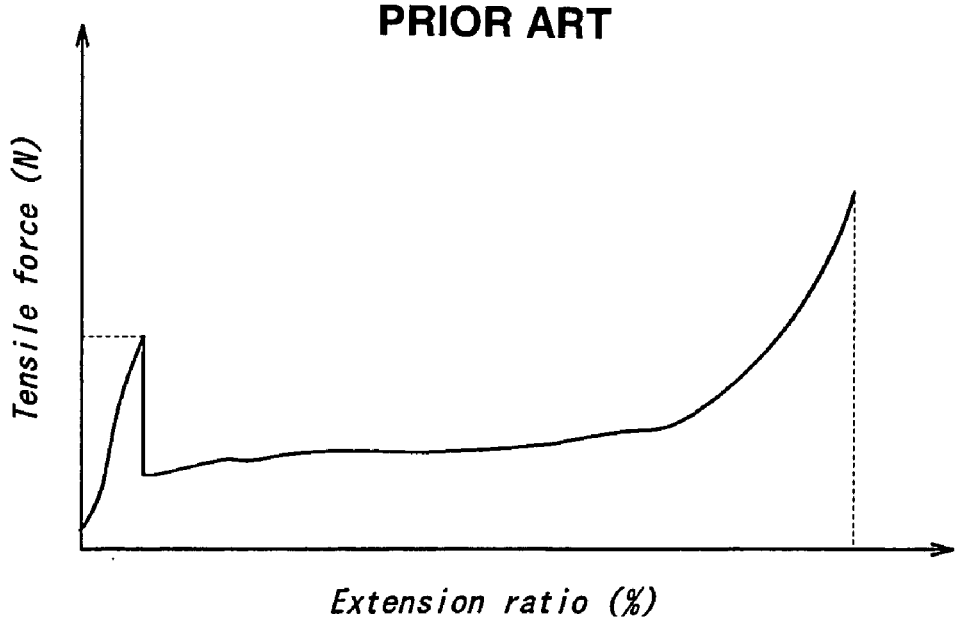
FIG. 3 is a graph showing a curve of a characteristic of extension ratio-tensile force of the conventional technique.

On the contrary, when the tensile force of the expansion-deforming portion of the toric air bag to the extension ratio violently and largely lowers in the expansion-deformation of the toric air bag and thereafter the tensile force hardly increases with the increase of the elongation as shown in FIG. 3, the expansion-deformation of the toric air bag by the drop of the internal tire pressure violently proceeds, and hence a local premature contact of the toric air bag with the inner face of the tire is caused unless the proceeding rate of the expansion-deformation in each portion of the toric air bag is constantly regulated at a higher accuracy, which results in biased contact of the toric air bag with the inner face of the tire, partial bending of the toric air bag and the like. There is a problem that the occurrence of such a phenomenon brings about the degradation of a so-called run-flat durability of the toric air bag.

Moreover, when initial rigidity in biaxial direction is given to the aforementioned expansion-deforming portion of the toric air bag, the shape holding property of the toric air bag 3 is sufficiently enhanced in the safety tire 1 and rim assembly and also the directionality in the expansion-deformation of the toric air bag is controlled, whereby the equality of the expansion-deformation can be further enhanced.

When the composite 10 is constructed with fibrous member 8 and rubber 9, it is preferable that a unit thickness of the fibrous member 8 is within a range of 0.05–2.0 mm in order to ensure relative uniform distribution of fibrous member 8 and rubber 9 to sufficiently develop functions of the composite as being expected.

In this case, it is preferable that the fibrous member 8 is constructed with non-oriented materials, because the composite is sufficiently equally extended in any directions with the removal of the directionality in the extension though the extension ratio of the expansion-deforming portion of the toric air bag is not less than 5% or not more than 5%, and further if the tire is relatively larger broken, the protrusion of the toric air bag 3 from the broken portion toward the outside of the tire is more effectively prevented under the restraint by the fibrous member 8 to improve the resistance to external injury.

Furthermore, it is preferable to dispersedly arrange fiber ends in the fibrous member 8 for preventing the concentration of strain or stress in the fiber ends during the deformation of the expansion-deforming portion of the toric air bag. For this purpose, it is desirable to use a nonwoven fabric as the fibrous member including a non-directionality.

Moreover, when the nonwoven fabric is used as the fibrous member 8, it is preferable that a fiber quantity to rubber 9 in the composite 10 is 4–50 mass % and a weight is within a range of 100–3000 mN/m² for sufficiently uniformizing relative distribution of rubber 9 and fibers to sufficiently develop the required function of the composite 10.

That is, when the fiber quantity is less than 4% or the weight is less than 100 mN/m², the penetrability of rubber is good, but the entanglement of fibers is lacking and it is difficult to ensure the rigidity, tension resistance and the like required for the composite 10, while when the fiber quantity exceeds 50% or the weight exceeds 3000 mN/m², the entanglement of fibers is sufficient, but the penetrability of rubber is poor and the interlaminar peeling in the nonwoven fabric or the like is easily caused and also the scattering of fiber distribution to rubber 9 becomes large to make non-uniform the strength, rigidity and the like in the one composite and hence it is difficult to stabilize the performances.

More preferably, the fibers in the nonwoven fabric have an average diameter of 0.01–0.2 mm and a length of not less than 8 mm. That is, when the fiber diameter is less than 0.01 mm, the entanglement of fibers is sufficient, but the penetrability of rubber is poor and a fear of causing the interlaminar peeling in the nonwoven fabric becomes high, while when it exceeds 0.2 mm, the penetrability of rubber is high, but the entanglement of fibers becomes less and a fear of making the rigidity or the like of the composite 10 lacking remains. And also, when the fiber length is less than 8 mm, the entanglement of fibers is less and the rigidity or the like as the composite tends to be lacking.

To the composite 10 can be applied a fibrous member comprised of plural fiber layers, fiber materials arranged side by side of which layers being crossed with each other, instead of the aforementioned fibrous member. Even in such a fibrous member, the shape holding property, equality of expansion-deformation and the like based on the rigidity in biaxial direction are sufficiently ensured and also the protrusion of the toric air bag outward from the broken portion of the tire can effectively be prevented.

In the invention, when the tension support member of the toric air bag 3 is constructed with two or more composite layers, the composites having the same kind of the fibrous members are arranged in lamination, or it is possible to arrange the composites having different kinds of the fibrous members in lamination.

And also, the tension support member constituting the expansion-deforming portion of the toric air bag is not necessary to be made uniform over the whole of the expansion-deforming portion. For example, it is possible to partially change the lamination number of the composites, if necessary.

Figure 4:
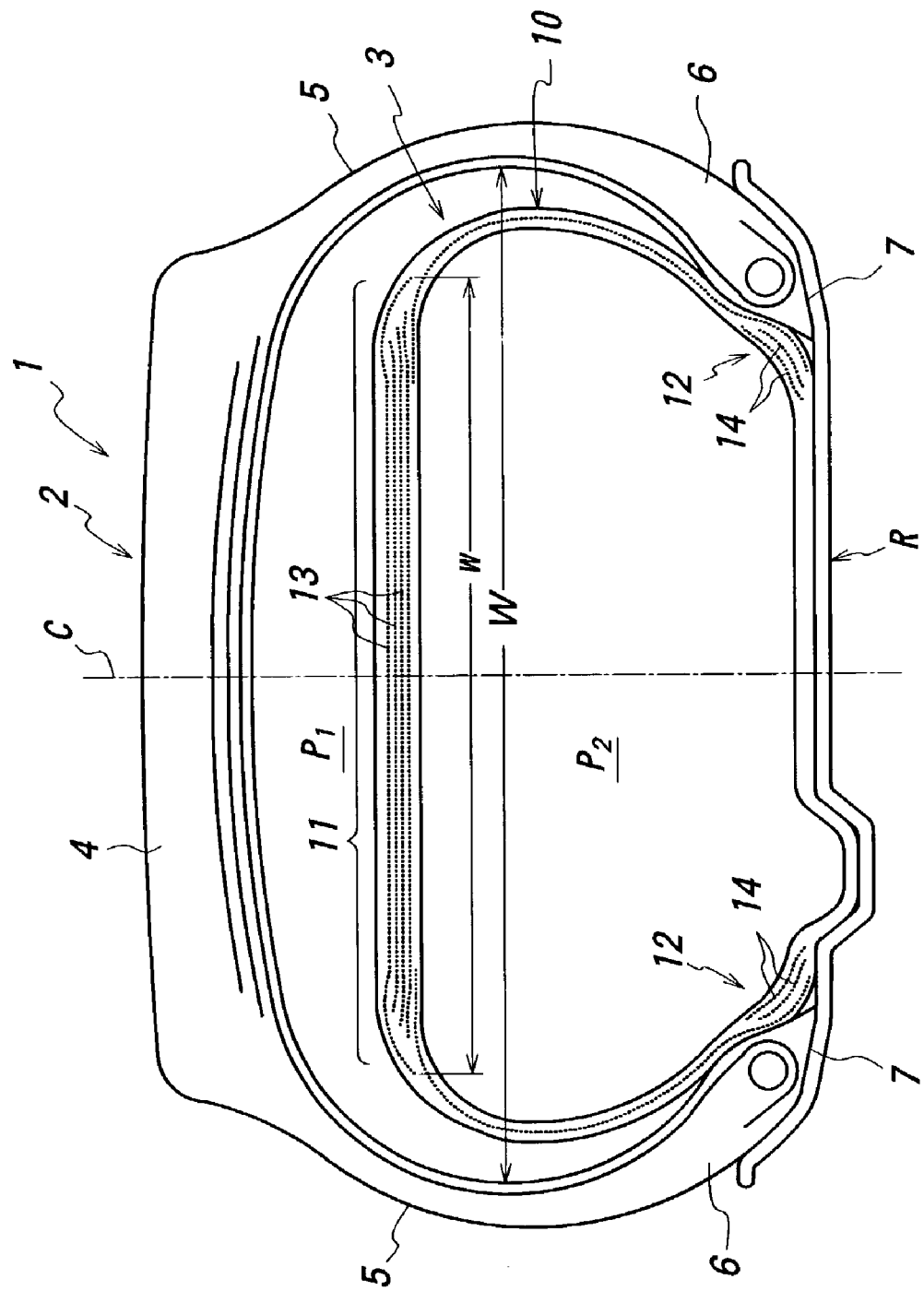
FIG. 4 is a diagrammatically section view of another embodiment of the toric air bag likewise FIG. 1.

FIG. 4 shows an example of the above, wherein two or more composite layers including the tension support member as a substrate are arranged in lamination on a crown region or a portion 11 corresponding to the inner circumferential face of the tire tread portion 4, and also two or more composite layers are arranged in lamination on a portion 12 corresponding to the bead base 7 of the tire and adjacent thereto, and all of these layers are united together.

In the illustrated embodiment, three layers of the composite 13 are added to the tension support member as a substrate in the portion 11 corresponding to the tread portion, while two layers of the composite 14 are added to the portion 12 corresponding to the bead base, whereby the displacement of the expansion-deforming portion of the toric air bag 3, particularly the portion 11 corresponding to the tread portion approaching to the tread portion through centrifugal force or the like is effectively prevented and the restraining force of the toric air bag 3 to a given position is more enhanced.

In this figure, the composite arranged as an innermost layer in the portion 11 is constructed by dividing the tension support member as a substrate to form a part of the tension support member, so that when the tension support member as a substrate is integrally formed as shown in FIG. 1, the innermost layer of the composite can be omitted from the structure shown in FIG. 4.

The composite 13 arranged in the portion 11 is preferable to have a width w corresponding to not less than 0.2 times a maximum width W between inner faces of the sidewall portions 5 in the safety tire 1 and rim assembly. Therefore, the composite 13 may be arranged over mutual positions of a maximum width of the toric air bag itself. According to this arrangement, creep of the composite 13 resulted from the action of centrifugal force or the like can be effectively prevented, and the function of the composite countering to centrifugal force or the like can be further enhanced.

In the latter case, non-uniform deformation of the portion 11 corresponding to the tread in the widthwise direction can be more effectively controlled in the expansion-deformation of the toric air bag 3.

In case of the tension support member having such a structure, it is preferable that each of the rigidity of the portion 11 corresponding to the tread portion and the rigidity of the portion 12 corresponding to the bead base is made larger than the rigidity of a side region therebetween at a posture of filling the internal pressure in the toric air bag 3 as shown in the figure, whereby the toric air bag itself is rendered into a stable flat form to prevent the undesirable contact of the portion 11 corresponding to the tread portion with the inner circumferential face of the tread portion through centrifugal force or the like. And also, this is preferable in the application of the toric air bag to a tire having a high flatness ratio.

When the composite is formed by the polymer sheet and rubber as mentioned above, it is preferable that the polymer sheet has an initial modulus of 0.1–1.3 GPa, a yield stress of 10–33 MPa and an elongation at break of not less than 20% for ensuring an excellent shape holding property and a smooth expansion-deformability in the toric air bag. Further, it is preferable that a property of conducting the contact of the toric air bag with the inner face of the tire in its plastic deformation region is given to the polymer sheet composite, mainly the polymer sheet for simply and surely conducting visual distinction between the toric air bag expansion-deformed once to develop its function and another toric air bag.

And also, the composites 13, 14 are integrally united with each other as shown in the figure, or they may be arranged so as to separate from each other.

In such a toric air bag 3 provided with the composites 10, 13, it is preferable that a ratio $E_P/E_W$ of tensile stress $E_P$ at 3% elongation in the circumferential direction of the toric air bag 3 to tensile stress $E_W$ at 3% elongation in the widthwise direction of the toric air bag 3 in the portion 11 corresponding to the tread portion is not less than 1 for controlling the size growth of the toric air bag 3 through centrifugal force or the like and leading smooth propagation of the expansion-deformation of the toric air bag 3 in the widthwise direction.

Viewing the toric air bag provided with the composites as a whole, it is preferable that a ratio $E_{CP}/E_{CW}$ of tensile stress $E_{CP}$ at 3% elongation in the circumferential direction to tensile stress $E_{CW}$ at 3% elongation in the widthwise direction at the portion 11 corresponding to the tread portion and a ratio $E_{SP}/E_{SW}$ of tensile stress $E_{SP}$ at 3% elongation in the circumferential direction to tensile stress $E_{SW}$ at 3% elongation in the widthwise direction at the side portion adjacent to the portion 11 corresponding to the tread portion satisfy the relation of $E_{CP}/E_{CW} \geq E_{SP}/E_{SW}$. In this case, the function of controlling the outer size can be more sufficiently developed by enhancing the rigidity of the portion 11 corresponding to the tread portion in the circumferential direction and hence the weight reduction can be attained while ensuring the function of controlling the outer size.

Figure 5:
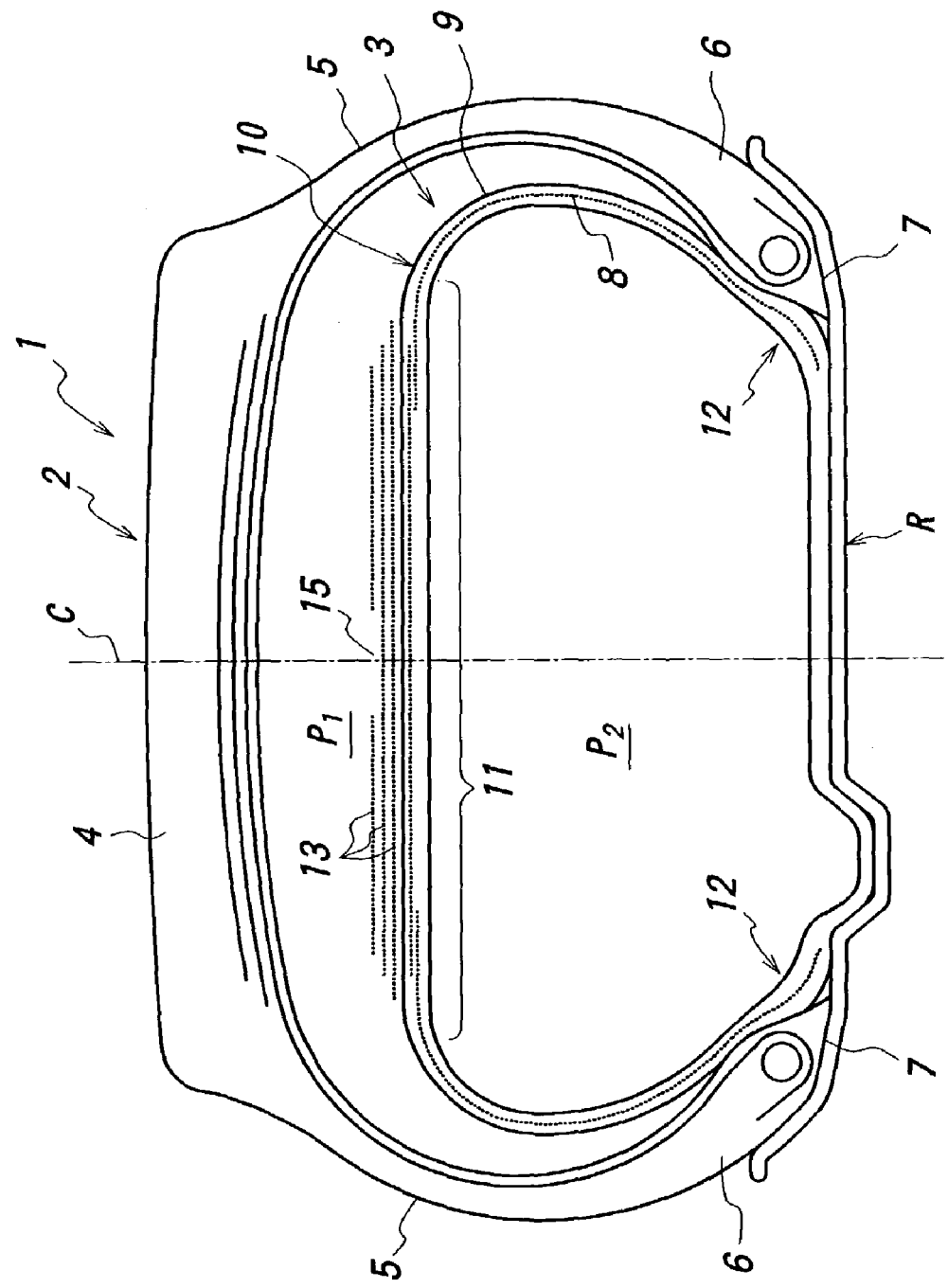
FIG. 5 is a schematically section view illustrating the other embodiment of the toric air bag.

In FIG. 5 is schematically shown another embodiment of the toric air bag, in which two or more composite layers including the tension support member as a substrate, four composite layers in total including three additional composite layers 13 in the illustrated embodiment are arranged on at least a portion 11 of a toric air bag 3 corresponding to the tread portion over a full circumference thereof and at least one layer of these composites 10, 13, for example, an outermost layer is provided with a low-rigidity part located at one or more positions in symmetry with an equatorial plane C of the tire, one low-rigidity part 15 formed by cutting out the outermost layer in an annular form across the equatorial plane C of the tire. In the invention, the low-rigidity part may be formed by decreasing the thickness of either the composite 10 or 13.

Figure 6:
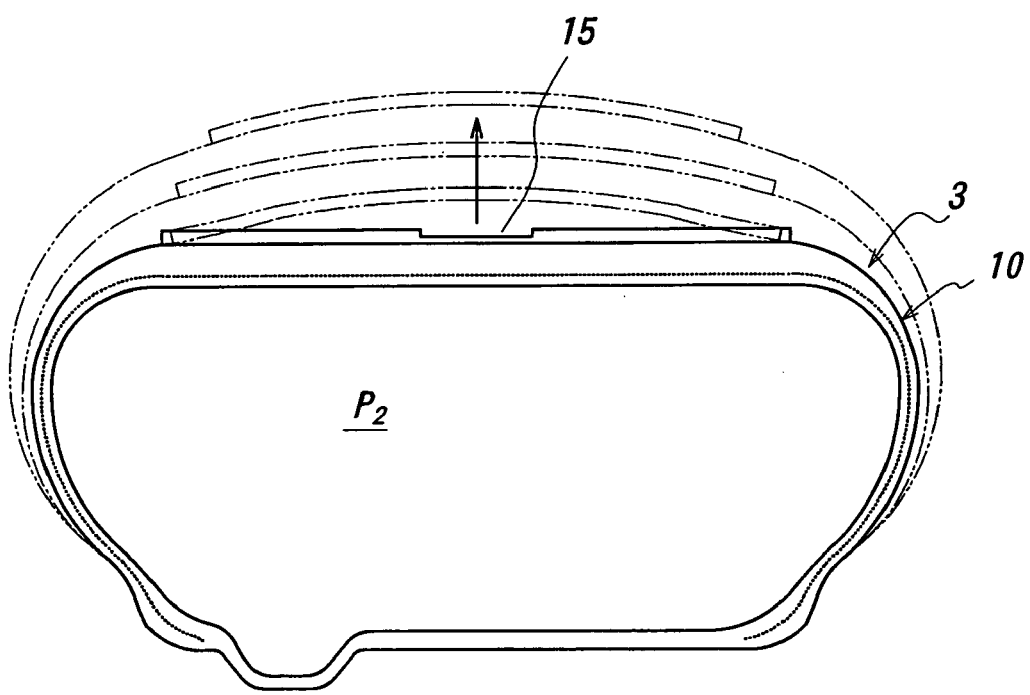
FIG. 6 is a diagrammatically section view illustrating an expansion-deformation embodiment of the toric air bag.

When the tension support member of the toric air bag 3 has such a structure, if the expansion-deforming portion of the toric air bag 3 is expansion-deformed by the drop of the internal tire pressure or the like, the low-rigidity part 13 of the composite 10, 13 having a smallest resistance to tensile force first starts extension-deformation through the internal pressure $P_2$ of the toric air bag irrespectively of the integrally united body of the composite 13 and the tension support member as the substrate or the separate body thereof, and the expansion-deforming portion of the toric air bag starts the expansion-deformation from the low-rigidity part 15 accompanied therewith as shown in FIG. 6.

The thus generated expansion-deformation of the toric air bag 3 gradually enlarges outward in the widthwise direction substantially symmetrically with respect to the equatorial plane C of the tire based on gradual propagation of the extension-deformation of the composite 10, 13 from a portion adjacent to the low-rigidity part 15 outward in the widthwise direction of the composite and finally the toric air bag 3 substantially equally expansion-deforms over a whole of a cross-sectional face shown in the figure.

Figure 7:
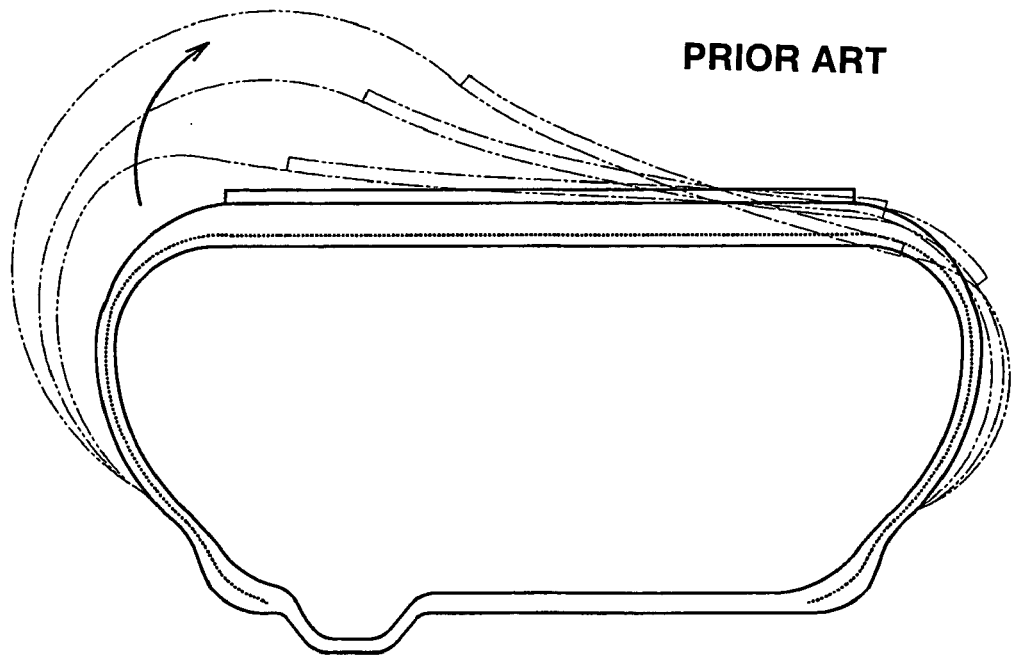
FIG. 7 is a diagrammatically section view illustrating an unfavorable expansion-deformation embodiment of the toric air bag.

On the contrary, when the above low-rigidity part is not formed, the rigidities of left and right side portions of the composite 10, 13 shown in the figure become non-uniform. As the rigidity difference becomes large, the toric air bag starts the biased expansion-deformation only at a side having a lower rigidity as shown in FIG. 7 and then the deformation proceeds only at this side, and in an extreme case, the composite 13 may be largely push-displaced toward the other side as shown in the figure.

When such a biased expansion-deformation is generated in the toric air bag, there is a fear of causing the thinning or the like due to the local extension-deformation of a part of the toric air bag in spite of the push-displacement of the composite 13, so that an anxiety remains in the load supporting ability, durability and the like of the toric air bag.

In the invention, therefore, even if there is a large scattering in the rigidities of the side portions of the composite, there can be sufficiently prevented the expansion-deformation of the toric air bag biasing toward one side of the composite in the widthwise direction, and hence there is not caused problems such as lowering of the load supporting ability, lowering of the durability and so on due to the local thinning of the toric air bag, local contacting with the inner face of the tire and the like.

Figure 8A:
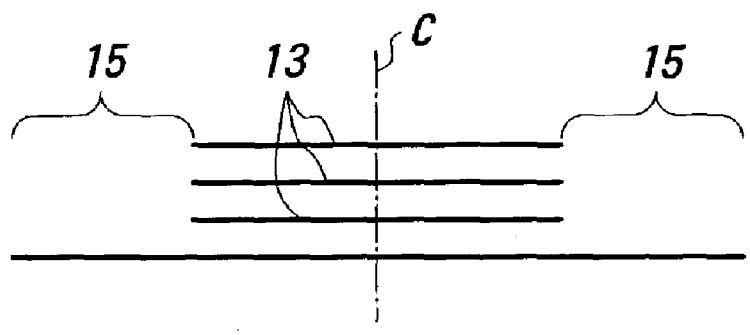
FIG. 8 is a schematically section view illustrating an embodiment of the low-rigidity part.
Figure 8B:
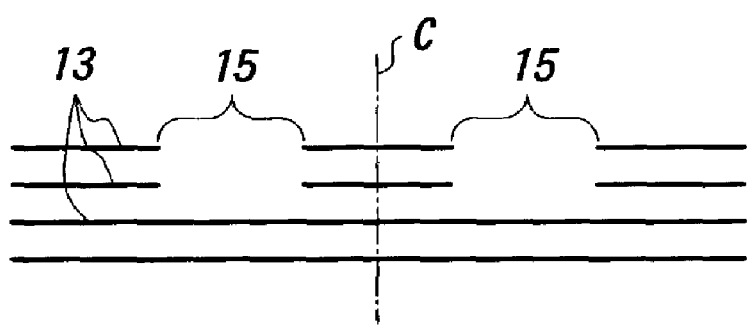

As shown in FIG. 8a, the low-rigidity part may be arranged in each side portion of the composite 13 in the widthwise direction. In this case, the rigidity of such side portions can be sufficiently decreased as compared with the other portion to start the propagation of the expansion-deformation of the toric air bag from these side portions. However, considering that the propagation of the expansion-deformation of the toric air bag is largely affected by the scattering of the rigidity particularly apt to be caused in the respective side portions of the composite, it is preferable to arrange the low-rigidity part in a position separated from the side edge of the composite as shown in FIG. 8b.

Even in these cases, the expansion-deformation of the toric air bag starts from these low-rigidity parts at substantially the same time, and the expansion-deformation region is enlarged symmetrically with respect to the equatorial plane C of the tire and then extends over a full width of the composite, and hence the occurrence of the biased expansion-deformation of the toric air bag can sufficiently be prevented and also a more rapid expansion-deformation of the toric air bag as a whole can be produced.

And also, the thus formed low-rigidity part can gradually change the rigidity in its inside. In this case, the enlargement of the expansion-deformation of the toric air bag 3, for example, from the central portion of the low-rigidity part toward the side thereof can be promoted smoothly and surely.

Figure 9:
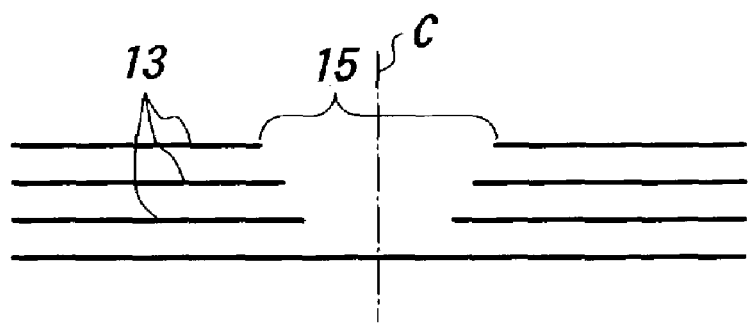
FIG. 9 is a schematically section view illustrating a rigidity change in the low-rigidity part.

FIG. 9 is a view illustrating an example of gradually changing the rigidity, in which the widths of cut-out portions of the composites in the low-rigidity part 15 are changed stepwise to gradually increase the rigidity from the center position of the low-rigidity part 15 toward the side thereof.

Figure 10:
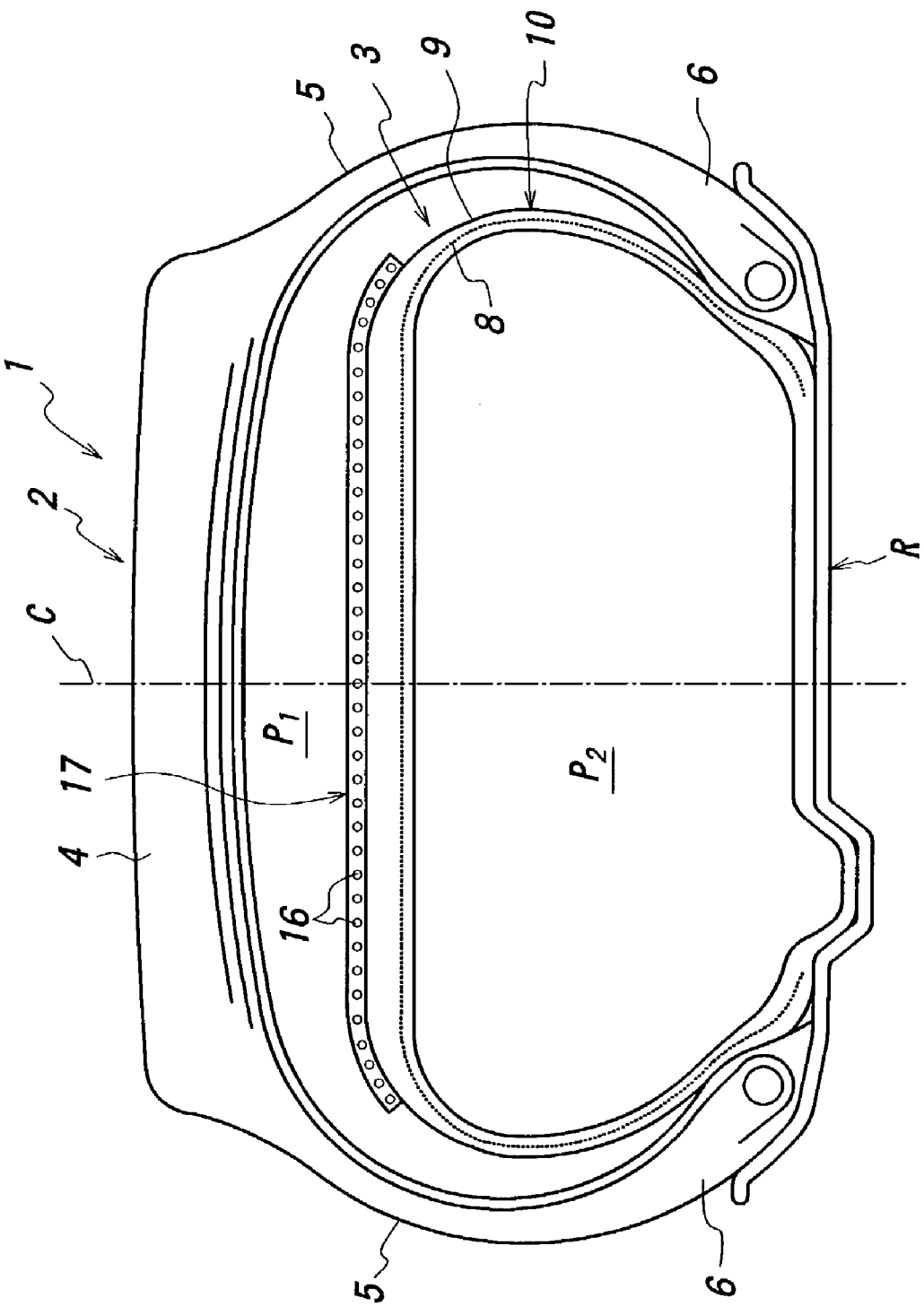
FIG. 10 is a schematically section view illustrating a further embodiment of the toric air bag.

FIG. 10 is a schematic view of a further embodiment of the toric air bag, in which a protection layer for the toric air bag is arranged on an outer circumferential side of the tension support member in the portion 11 corresponding to the tread portion.

That is, one or more protection layers 17 comprised of plural reinforcing elements such as cords or filaments, preferably chemical fiber cords extending in the circumferential direction in substantially wavy form, preferably rubberized reinforcing elements 16 are arranged on the outer circumferential side of the tension support member.

Figure 11:
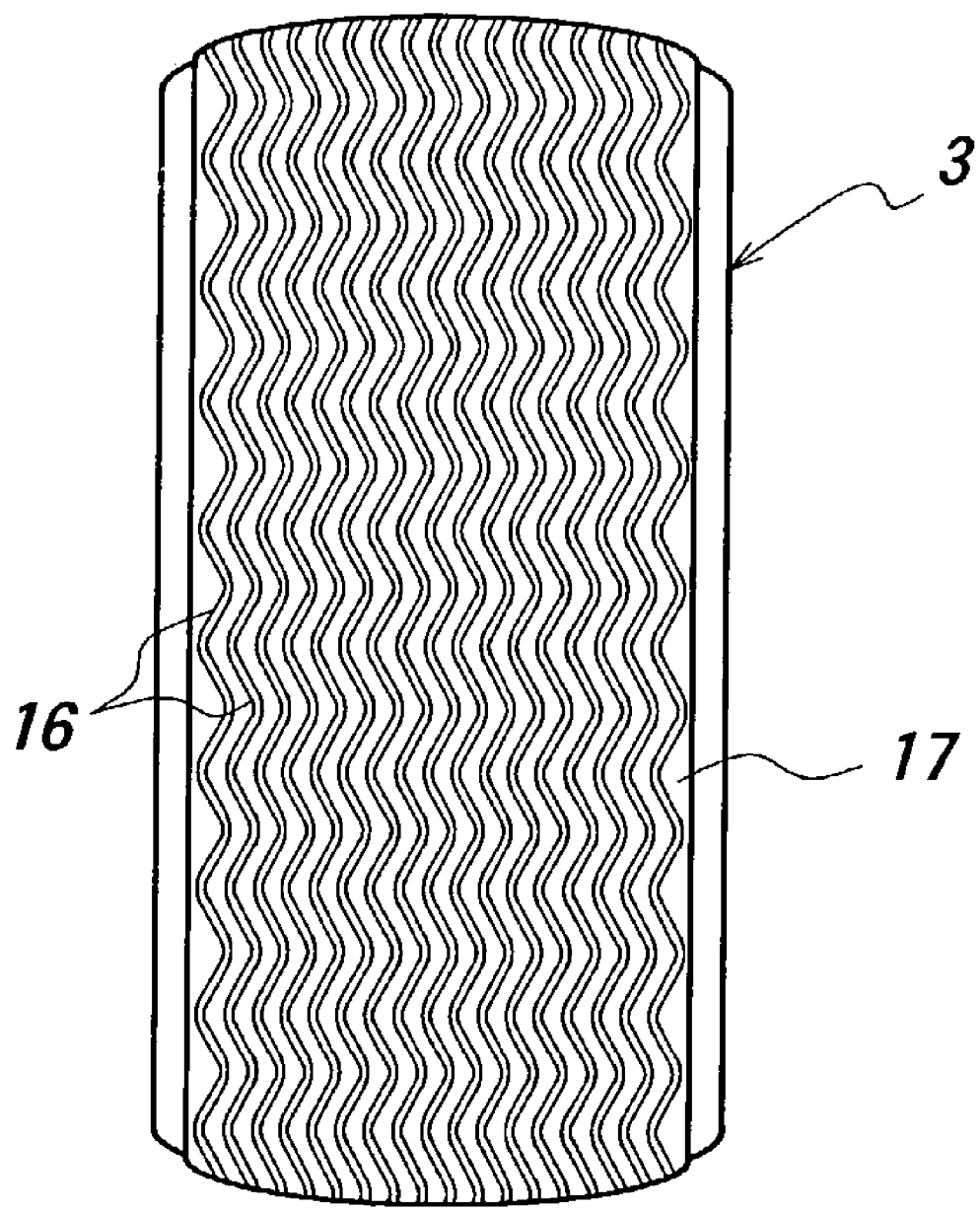
FIG. 11 is a plan view of a protection layer in the toric air bag.

FIG. 11 is a plan view exaggeratedly illustrating the protection layer for the toric air bag shown in FIG. 10. The reinforcing elements 16 in the protection layer 17 have a wavy form shown in the figure even at a state of filling a given internal pressure into the toric air bag 3. In this case, it is preferable that the reinforcing elements 16 have a relative arranging relation that the wavy form is aligned at the same phase or in a regular phase shift in the plane.

Therefore, these reinforcing elements 16 have a wavy form having a smaller wavy pitch and a larger amplitude before the filling of the internal pressure into the toric air bag 3.

Figure 12:
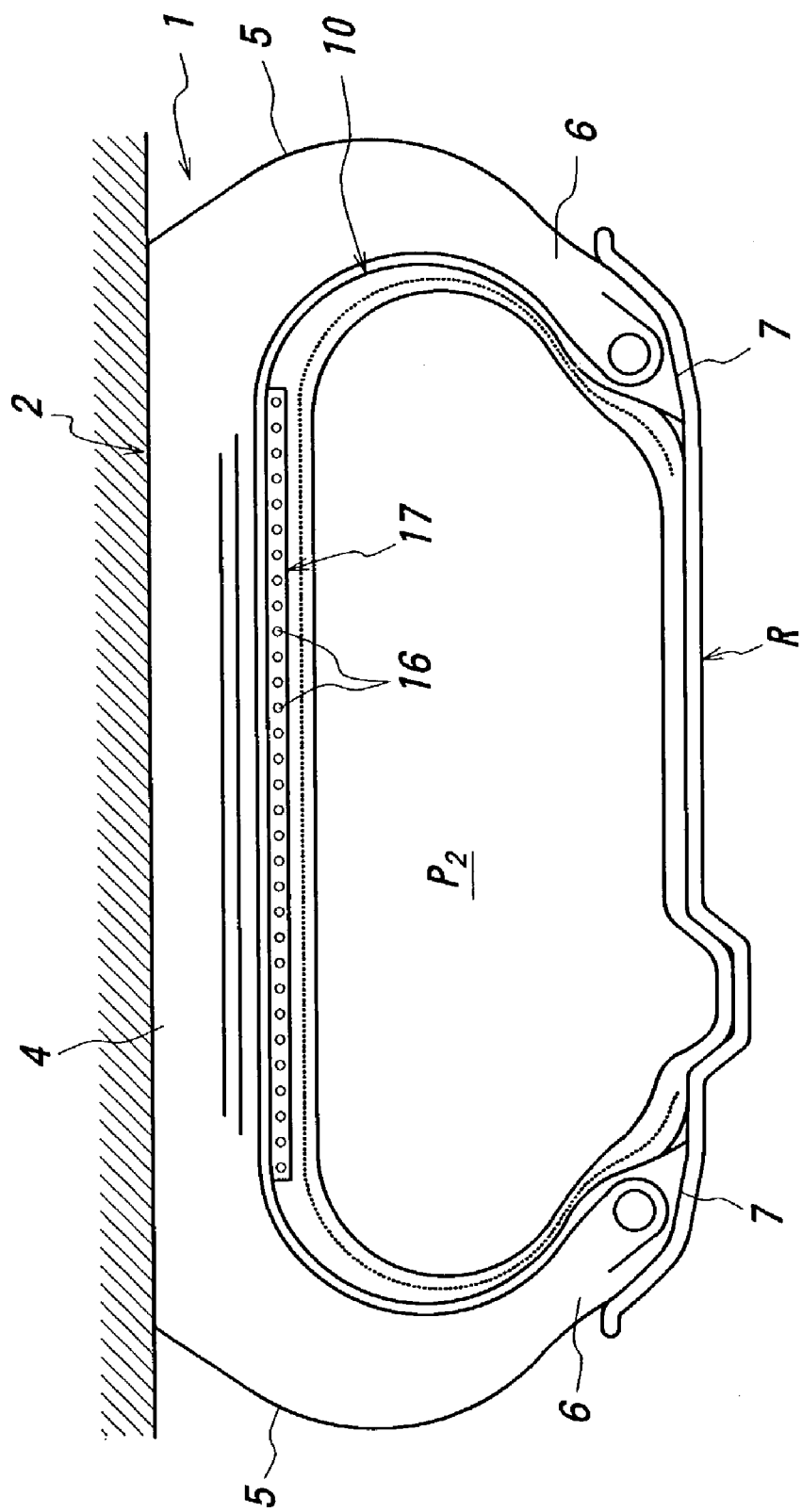
FIG. 12 is a schematically section view illustrating a state of supporting a load by the toric air bag.

When the internal tire pressure is dropped, the above toric air bag 3 is expansion-deformed from the state shown in FIGS. 10 and 11 to about 15–25% as a circumferential length under the action of the internal pressure previously filled thereinto to subrogate the support of load from the tire 2 at a posture of closing to the inner face of the tire as shown by a cross section in FIG. 12. In this case, the protection layer 8 has such a state that the reinforcing elements 16 retain the wavy form even at the ground contact region in accordance with the selection of initial wavy pitch and amplitude in the reinforcing element 16 and hence the reinforcing element 16 has yet a sufficient extension margin and tension is not substantially applied thereto.

Figure 13:
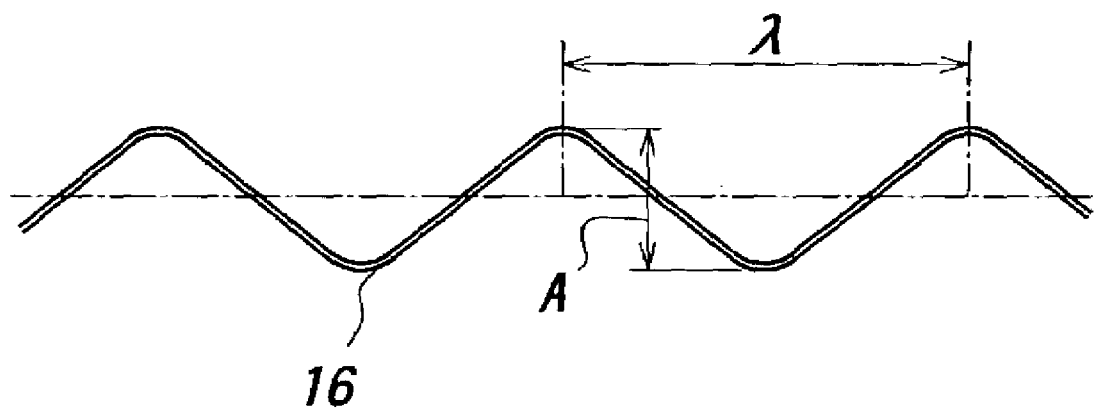
FIG. 13 is a view illustrating an initial existing state of a reinforcing element.

In order to leave the sufficient extension margin to the reinforcing element 16 even at this state, if the increase of the circumferential length of the toric air bag 3 from the state shown in FIGS. 10 and 11 to the state shown in FIG. 12 is made 20%, it is preferable that a ratio $A/\lambda$ of amplitude A to wavy pitch $\lambda$ of the reinforcing element 16 as shown in FIG. 13 under the state shown in FIGS. 10 and 11 is within a range of 0.35–0.50.

In a so-called run-flat state as shown in FIG. 12, therefore, when foreign matter given external injury to the tread portion 4 of the tire 2 arrives at the toric air bag 3, since the toric air bag 3 has an excellent flexibility based on the extension margin of the reinforcing element 16, it deforms so as to envelop the foreign matter and hence the damage of the toric air bag 3 due to the arrival of the foreign matter is sufficiently prevented.

EXAMPLES

Example 1

With respect to various safety tires wherein a structure of a tension support member as an expansion-deforming portion of a toric air bag placed in a tire having a size of 315/60R22.5 is varied, the running durability, resistance to external injury and resistance to piercing of foreign matter in the safety tire are measured under a state that the toric air bag is completely expansion-deformed by dropping an internal tire pressure to an atmospheric pressure to obtain results as shown in Table 1. In this table, the larger the index value, the better the result.

The running durability is determined by measuring a running distance until the load can not be supported by the toric air bag when a low internal pressure drum test is carried out at a state (after the confirmation of run-flat state) that the internal tire pressure is rapidly dropped from a state of normally running the safety tire under loading (internal tire pressure: 900 kPa, internal pressure of toric air bag: 950 kPa).

The resistance to external injury is determined by measuring a running distance until the load can not be supported by the toric air bag when a low internal pressure drum test is carried out at a state that assuming a puncture due to side cut on markets, a cut damage (cut of 60 mm in a radial direction) is previously formed in a side portion of the tire and the internal tire pressure is at a loss state and an internal pressure of 400 kPa is filled in the toric air bag placed in the tire.

The resistance to piercing of foreign matter is determined by measuring a running distance in the same manner as described above when a low internal pressure drum test is carried out at a state that assuming very severe running condition such as running on bad road in markets or the like and such a state that foreign matter scattered on a road is treaded by the tire and passes through the tire to cause puncture of the tire and arrives at the toric air bag to fear damage of the toric air bag by a sharp edge of the foreign matter, a bolt of M10 is embedded to a depth of 40 mm in a center of a tire tread and an internal pressure of 400 kPa is filled into the toric air bag.

Figure 14A:
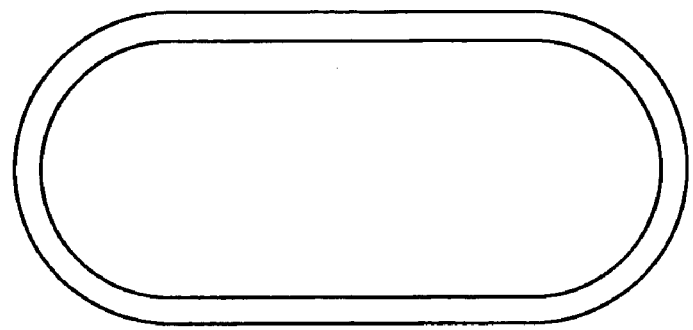
FIG. 14 is a schematically section view of a toric air bag in comparative tires.

In a conventional tire, the toric air bag is comprised of only rubber as shown by a schematic section in FIG. 14a.

Figure 14B:
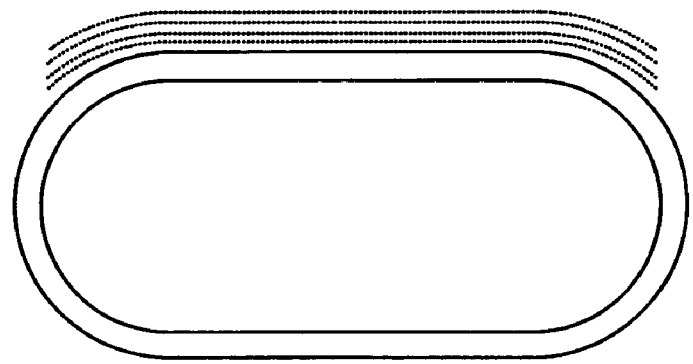

In a comparative tire 1, four layers of nonwoven fabric composite are arranged on a crown region of the toric air bag as shown in FIG. 14b.

Figure 14C:
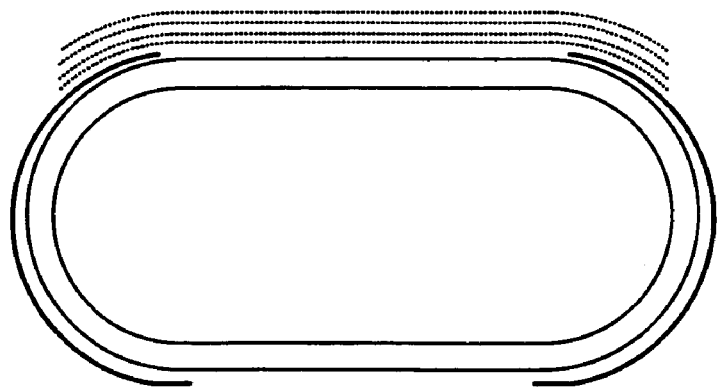

In a comparative tire 2, as shown in FIG. 14c, a single cord composite comprised of two cord layers containing cords arranged side by side therein, cords of which layers being crossed with each other, is arranged over a region ranging from a side portion of the toric air bag to a portion corresponding to a bead base in addition to the structure shown in FIG. 14b. In this case, the cord composite has a characteristic of extension ratio-tensile force shown in FIG. 3.

In a comparative tire 3, the cord composite in the toric air bag of the comparative tire 2 is replaced with a cord composite comprised of one cord layer containing cords extended in only one direction and at a cord angle of 30° with respect to a meridianal line of the toric air bag.

Figure 15A:
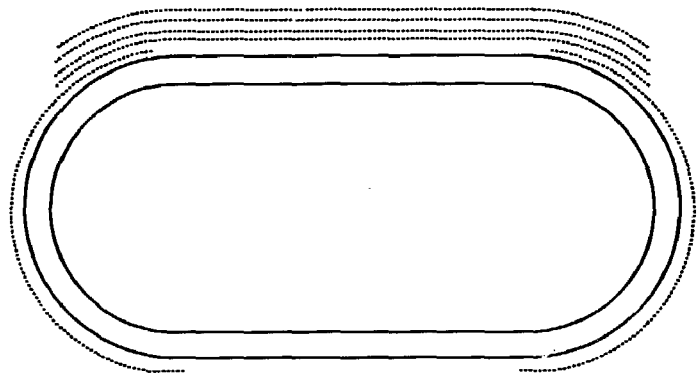
FIG. 15 is a schematically section view of a toric air bag in example tires.

In a toric air bag of an example tire 1, as shown in FIG. 15a, one layer of nonwoven fabric composite is arranged on a region ranging from a side portion to a portion corresponding to a bead base and four layers in total of nonwoven fabric composite are arranged on a crown region.

In a toric air bag of an example tire 2, one layer of nonwoven fabric composite is arranged over a whole of a region from a portion corresponding to a bead base to a portion corresponding to another bead base.

Figure 15B:
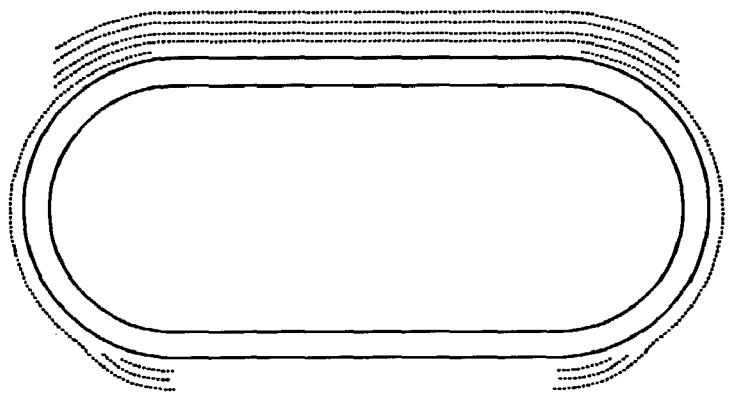

In a toric air bag of an example tire 3, as shown in FIG. 15b, two layers of nonwoven fabric composite are further arranged on the portion corresponding to the bead base in addition to the structure shown in FIG. 15a.

In a toric air bag of an example tire 4, the nonwoven fabric composite of the example tire 3 is replaced with a polyethylene sheet.

Figure 15C:
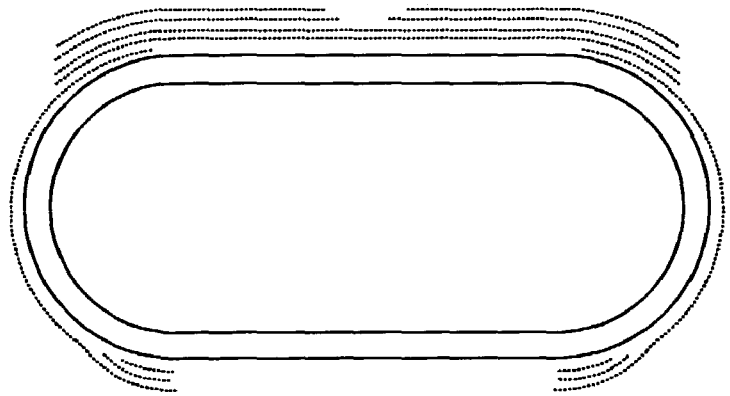

In a toric air bag of an example tire 5, as shown in FIG. 15c, a low-rigidity part located at a central portion in a widthwise direction is formed in two outer layers of the composite on a crown region in the same arrangement of the nonwoven fabric composite as in the example tire 3.

Figure 16A:
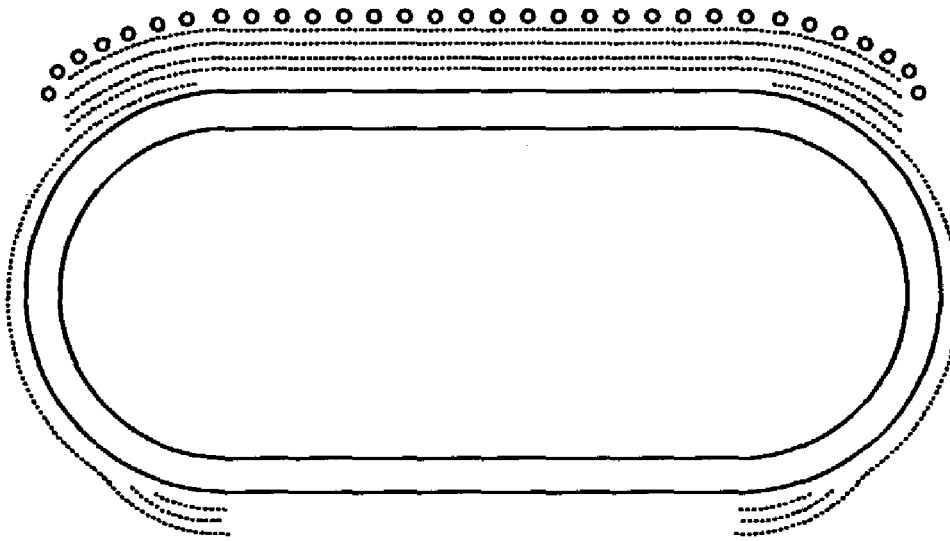
FIG. 16 is a schematically section view of a toric air bag in another example tires.

In a toric air bag of an example tire 6, as shown in FIG. 16a, a protection layer comprised of aramid fiber cords extending in a circumferential direction in substantially a wavy form is arranged on an outer periphery of the crown region of the toric air bag shown in FIG. 15b.

Figure 16B:
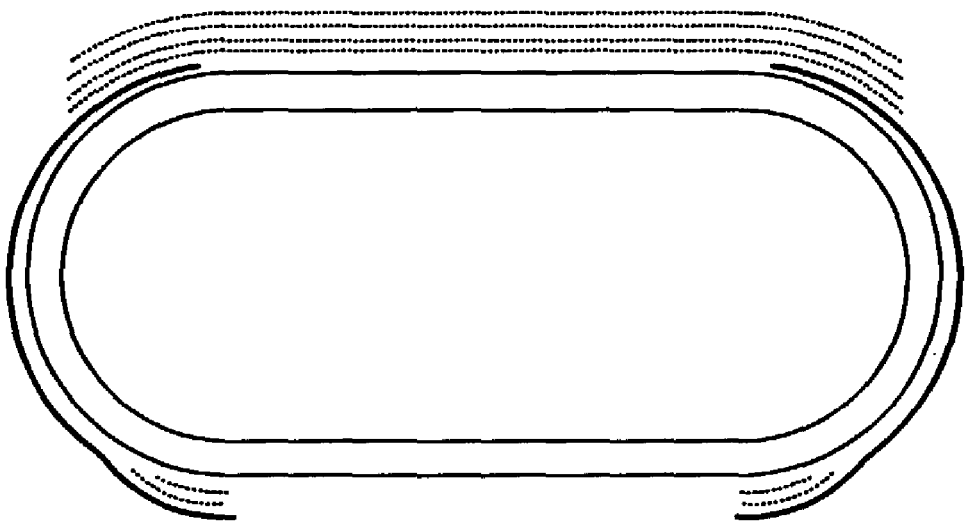

In toric air bag of an example tire 7, as shown in FIG. 16b, one layer of the non-woven fabric composite arranged over a region from a side portion corresponding to a bead base in the toric air bag shown in FIG. 15b is replaced with one layer of cord composite comprised of two cord layers containing cords arranged side by side therein, cords of which layers being crossed with each other, and a cord angle with respect to a meridianal line of the toric air is 45°.

TABLE 1

|  | Conventional tire | Comparative tire 1 | Comparative tire 2 | Comparative tire 3 | Example tire 1 | Example tire 2 | Example tire 3 |
|---|---|---|---|---|---|---|---|
| Composite crown region | none | nonwoven fabric: four layers | nonwoven fabric: four layers | nonwoven fabric: four layers | nonwoven fabric: four layers | nonwoven fabric: one layer | nonwoven fabric: four layers |
| side region | none | none | cross cord: one layer | unidirectional cord: one layer *1 | nonwoven fabric: one layer | nonwoven fabric: one layer | nonwoven fabric: one layer |
| portion corresponding to bead base | none | none | cross cord: one layer | unidirectional cord: one layer | nonwoven fabric: one layer | nonwoven fabric: one layer | nonwoven fabric: three layers |
| low-rigidity part | none | none | none | none | none | none | none |
| Running durability (index) | — | 50 | 80 | 100 | 140 | 130 | 180 |
| Resistance to external injury (index) | no run-flat running *3 | no run-flat running *3 | 90 | 100 | not less than 200 | not less than 200 | not less than 200 |
| Resistance to piercing of foreign matter (index) | — | — | — | — | — | — | 100 |
| Figure | FIG. 14a | FIG. 14b | FIG. 14c | FIG. 14c | FIG. 15a | — | FIG. 15b |

|  | Example tire 4 | Example tire 5 | Example tire 6 | Example tire 7 |
|---|---|---|---|---|
| Composite crown region | resin: four layers *2 | nonwoven fabric: four layers | nonwoven fabric: four layers | nonwoven fabric: four layers |
| side region | resin: one layer | nonwoven fabric: one layer | nonwoven fabric: one layer | cross cord: one layer |
| portion corresponding to bead base | resin: three layers | nonwoven fabric: three layers | nonwoven fabric: three layers | cross cord: one layer + nonwoven fabric: two layers |
| low-rigidity part | none | none | presence | none |
| Running durability (index) | 180 | 200 | 180 | 170 |
| Resistance to external injury (index) | not less than 200 | not less than 200 | not less than 200 | not less than 200 |
| Resistance to piercing of foreign matter (index) | — | — | not less than 200 | — |
| Figure | FIG. 15b | FIG. 15c | FIG. 16a | FIG. 16b |

Specification of nonwoven fabric
Weight: 500 mN/m$^2$
Thickness: 0.1 mm
Fiber diameter: 0.02 mm
Fiber length: 44 mm
Fiber quantity in composite: 28 mass %
*1 Specification of cord
Cord: 66 Nr
Cord diameter: 0.61 mm
Treat gauge: 1.2 mm
End count: 31 cords/5 cm
*2 Specification of resin
Polyethylene sheet
Initial modulus: 1.1 GPa
Yield stress: 30 MPa
Elongation at break: 650%
Gauge: 0.8 mm
*3 In case of a side structure having no composite at a state of filling an internal pressure, the toric air bag projects from a side cut damage of the tire and hence the running at flat state is impossible.

As seen from this table, all example tires develop excellent running durability and resistance to external injury, and the example tire 6 provided with the protection layer can sufficiently develop the resistance to piercing of foreign matter.

Example 2

In toric air bags of example tires having the same structure as in the toric air bag of the example tire 1 shown in FIG. 15a, when the construction of the composite itself in the nonwoven fabric composite is varied, results measured on a run-flat running durability are shown in Table 2.

The run-flat running durability is measured in the same manner as in the running durability in Example 1. The larger the index value, the better the result.

TABLE 2

|  | Example tire 11 (Example tire 1) | Example tire 12 | Example tire 13 | Example tire 14 | Example tire 15 | Example tire 16 | Example tire 17 | Comparative tire 11 | Comparative tire 12 | Comparative tire 13 | Comparative tire 14 |
|---|---|---|---|---|---|---|---|---|---|---|---|
| Weight of nonwoven fabric mN/m$^2$ | 500 | 200 | 1000 | 2000 | 3000 | 500 | 4000 | 50 | 500 | 500 | 500 |
| Unit thickness of nonwoven fabric mm | 0.1 | 0.05 | 0.2 | 0.4 | 0.7 | 0.15 | 2.1 | 0.02 | 0.2 | 0.06 | 0.1 |
| Fiber diameter constituting nonwoven fabric mm | 0.02 | 0.02 | 0.02 | 0.02 | 0.02 | 0.03 | 0.02 | 0.02 | 0.3 | 0.005 | 0.02 |
| Fiber length constituting nonwovern fabric mm | 44 | 44 | 44 | 44 | 44 | 51 | 44 | 44 | 44 | 44 | 6 |
| Fiber quantity in one composite layer % | 28 | 18 | 32 | 39 | 50 | 20 | 78 | 8 | 17 | 50 | 50 |
| Running durability (index) | 140 | 125 | 140 | 135 | 120 | 120 | 110 | 90 | no run-flat running | | |

As seen from Table 2, since the weight of the nonwoven fabric is too small and the entanglement of fibers is less in the comparative tire 11, the gradual increase of tensile force per unit width can not be produced with the increase of the elongation through the expansion-deformation of the toric air bag, so that the running durability is lower than that of the comparative tire 3 in Example 1.

In the comparative tire 12, the fiber diameter in the nonwoven fabric is too large and the entanglement of fibers is less. In the comparative tire 13, the fiber diameter is too fine and the rubber penetrability is poor. In the comparative tire 14, the fiber length in the nonwoven fabric is too short and the entanglement of fibers is less. In any case, the characteristic of extension ratio-tensile force required in the expansion-deformation of the toric air bag can not be realized and hence the running at the flat state is substantially impossible.

On the contrary, all example tires 11–17 can develop an excellent running durability.

in a circumferential direction of the toric air bag to tensile stress $E_W$ at 3% elongation in a widthwise direction of the toric air bag in a portion corresponding to an inner face of the tire is varied, and when a ratio $E_{CP}/E_{CW}$ of tensile stress $E_{CP}$ at 3% elongation in a circumferential direction to tensile stress $E_{CW}$ at 3% elongation in a widthwise direction at a portion corresponding to an inner face of the tire and a ratio $E_{SP}/E_{SW}$ of tensile stress $E_{SP}$ at 3% elongation in a circumferential direction to tensile stress $E_{SW}$ at 3% elongation in a widthwise direction at a side portion adjacent to the portion corresponding to an inner face of the tire are varied, results measured on a run-flat durability are shown in Table 3.

In this case, $E_P = E_{CP}$ and $E_W = E_{CW}$, so that they are shown in the same column of Table 3.

And also, the run-flat durability is measured in the same manner as in the running durability of Example 1, wherein the larger the index value, the better the result.

The number of the composite layers in the table is changed for adjusting stress and stress ratio of the toric air bag itself, in which the weight of the toric air bag increases as the layer number increases.

TABLE 3

|  | Example tire 21 (Example tire 1) | Example tire 22 | Example tire 23 | Example tire 24 | Comparative tire 21 | Comparative tire 22 |
|---|---|---|---|---|---|---|
| Number of composite layers | 4 | 4 | 6 | 3 | 8 | 10 |
| $E_{CP}/E_{CW}$ ($E_P/E_W$) | 2 | 2 | 1 | 3 | 0.75 | 0.5 |
| $E_{SP}/E_{SW}$ | 2 | 1 | 1 | 0.75 | 0.75 | 0.75 |
| Total weight of toric air bag (index) | 100 | 95 | 92 | 89 | 112 | 118 |
| Running durability (index) | 140 | 140 | 130 | 135 | 140 | 135 |

Example 3

In toric air bags of example tires having the same structure as in the toric air bag of the example tire 1 shown in FIG. 15a, when a ratio $E_P/E_W$ of tensile stress $E_P$ at 3% elongation Specification of nonwoven fabric Weight: 500 mN/m$^2$ Thickness: 0.1 mm Fiber diameter: 0.02 mm Fiber length: 44 mm Fiber quantity in composite: 28 mass %

As seen from Table 3, the excellent run-flat durability can be developed when satisfying stress conditions of $E_P/E_W \geq 1$ and $E_{CP}/E_{CW} \geq E_{SP}/E_{SW}$. And also, it is understood that it is obliged to highly increase the weight of the toric air bag (increase of index value) in the comparative tires 21 and 22 increasing the number of composite layers for satisfying a given stress condition.

INVENTION APPLICABILITY

As seen from the above, according to the invention, the excellent run-flat durability can be developed by gradually extension-deforming the toric air bag without breaking cords or the like in the expansion-deformation of the toric air bag accompanied with the internal tire pressure to equally contact the toric air bag with the inner face of the tire.

The invention claimed is:

1. A toric air bag adapted to be placed inside a safety tire and when inflated under a certain internal pressure and expansion-deformed by a drop of an internal tire pressure subrogates a load support from the tire, wherein at least an expansion-deforming portion of the toric air bag having a hollow torus shape is made of a tension support member and the expansion-deforming portion has a characteristic of extension ratio-tensile force that as an extension is increased by the expansion-deformation, a tensile force per unit width is gradually increased;

wherein the tension support member is constructed with two or more layers of a composite of fibrous non-woven fabric and rubber.

2. A toric air bag according to claim 1, wherein an initial rigidity in a biaxial direction is given to the expansion-deforming portion of the toric air bag, wherein the initial rigidity is a tensile modulus determined from a gradient up to 5% extension before the expansion-deforming portion or the tension support member is directly subjected to the expansion-deformation and not less than 10 MPa, and the biaxial direction is along two axial lines perpendicular to each other in an arbitrary direction.

3. A toric air bag according to claim 1, wherein a curve of tensile force to extension ratio in the expansion-deforming portion of the toric air bag is changed in substantially a hook form within an extension range up to 100% extension ratio.

4. A toric air bag according to claim 1, wherein an average gradient of tensile force to an extension ratio of 0–5% in the expansion-deforming portion of the toric air bag is made larger than an average gradient of tensile force to an extension ratio of 5–100%.

5. A toric air bag according to claim 4, wherein a degree of lowering the tensile force to the extension ratio of 5–100% from a maximum value of the tensile force to the extension ratio of 0–5% in the expansion-deforming portion of the toric air bag is rendered into not more than 50% of the maximum value.

6. A toric air bag according to claim 1, wherein the fibrous non-woven fabric has a unit thickness of 0.05–2.0 mm.

7. A toric air bag according to claim 1, wherein the fibrous non-woven fabric is constructed with a nonoriented fiber material.

8. A toric air bag according to claim 1, wherein ends of fibers in the fibrous non-woven fabric are dispersedly arranged.

9. A toric air bag according to claim 1, wherein a quantity of fiber to rubber in the non-woven fabric is within a range of 4–50 mass %.

10. A toric air bag according to claim 1, wherein the non-woven fabric has a weight of 100–3000 $mN/in^2$.

11. A toric air bag according to claim 1, wherein a diameter of the fiber in the non-woven fabric is within a range of 0.01–0.2 mm.

12. A toric air bag according to claim 1, wherein two or more composite layers are arranged on a portion at least corresponding to an inner circumferential face of a tire tread portion.

13. A toric air bag according to claim 1, wherein two or more layers of the composite are arranged over mutual points corresponding to a position of a maximum width of the toric air bag.

14. A toric air bag according to claim 1, wherein two or more layers of the composite are arranged on a portion corresponding to a bead base of the tire.

15. A toric air bag according to claim 1, wherein each of a rigidity at a crown region and a rigidity at a region corresponding to the bead base of the tire in the toric air bag at a posture under an inflation of an internal pressure is made larger than a rigidity at each side region adjacent to the crown region.

16. A toric air bag according to claim 1, wherein a ratio Ep/EW of tensile stress Ep at 3% elongation in a circumferential direction to tensile stress Ew at 3% elongation in a widthwise direction at a portion facing to an inner circumferential face of a tread portion of the tire is not less than 1.

17. A toric air bag according to claim 1, wherein in a toric air bag provided with a composite, a ratio $E_{CP}/E_{CW}$ of tensile stress $E_{CP}$ at 3% elongation in a circumferential direction to tensile stress $E_{CW}$ at 3% elongation in a widthwise direction at a portion facing to an inner circumferential face of a tread portion and a ratio $E_{SP}/E_{SW}$ of tensile stress $E_{SP}$ at 3% elongation in the circumferential direction to tensile stress at 3% elongation in the widthwise direction at a side portion adjacent to the portion facing to the inner circumferential face of the tread portion satisfy a relation of $E_{CP}/E_{CW} \geq E_{SP}/E_{SW}$.

18. A tone air bag according to claim 1, wherein at least one protection layer comprising a plurality of reinforcing elements extending in a circumferential direction in substantially a wavy form is arranged on at least a portion facing to an inner circumferential face of a tread portion of the tire along a full circumference thereof, and wavy pitch and amplitude of the reinforcing element are selected so as to still retain the wavy form in the reinforcing element at a posture of closing the toric air bag to the inner face of the tire.

19. A toric air bag according to claim 18, wherein the reinforcing element is a chemical fiber cord.

* * * * *